(12) United States Patent
Andoh et al.

(10) Patent No.: US 6,949,896 B2
(45) Date of Patent: Sep. 27, 2005

(54) APPARATUS FOR AND METHOD OF DRIVING MOTOR TO MOVE OBJECT AT A CONSTANT VELOCITY

(75) Inventors: Toshiyuki Andoh, Kanagawa (JP); Hiromichi Matsuda, Kanagawa (JP); Makoto Komatsu, Kanagawa (JP); Tadashi Shinohara, Kanagawa (JP); Yuuji Matsuda, Tokyo (JP); Kazuhiko Kobayashi, Tokyo (JP); Nobuto Yokokawa, Saitama (JP); Masato Yokoyama, Kanagawa (JP); Yohhei Miura, Chiba (JP); Toshiyuki Takahashi, Kanagawa (JP); Jun Hosokawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 10/725,450

(22) Filed: Dec. 3, 2003

(65) Prior Publication Data

US 2004/0164691 A1 Aug. 26, 2004

(30) Foreign Application Priority Data

Dec. 3, 2002 (JP) .................................... 2002-351767
Aug. 29, 2003 (JP) .................................... 2003-307332

(51) Int. Cl.$^7$ ............................................... H02K 41/00
(52) U.S. Cl. ........................ 318/135; 318/560; 318/687
(58) Field of Search ................................. 318/135, 116, 318/560, 687, 567, 632, 561; 700/12; 399/12, 45

(56) References Cited

U.S. PATENT DOCUMENTS

| | | | | |
|---|---|---|---|---|
| 5,325,028 A | * | 6/1994 | Davis | 318/560 |
| 5,736,822 A | * | 4/1998 | Mitarai et al. | 318/116 |
| 5,757,149 A | * | 5/1998 | Sato et al. | 318/135 |
| 2003/0097193 A1 | * | 5/2003 | Makino et al. | 700/42 |
| 2003/0128999 A1 | * | 7/2003 | Bessho et al. | 399/121 |

FOREIGN PATENT DOCUMENTS

| JP | 2754582 | 3/1998 |
|---|---|---|
| JP | 2000-47547 | 2/2000 |

* cited by examiner

*Primary Examiner*—Karen Masih
(74) *Attorney, Agent, or Firm*—Oblon, Spivak, McClelland, Maier & Neustadt, P.C.

(57) ABSTRACT

A drive control method includes detecting an angular displacement of a rotor driven by a pulse motor, calculating a difference between the detected angular displacement and a preset target value of the angular displacement, and calculating a drive pulse frequency of a drive pulse signal used to drive the pulse motor. The pulse motor is driven by the drive pulse signal having the drive pulse frequency to allow the rotor at a constant angular velocity.

24 Claims, 20 Drawing Sheets

APPARATUS FOR AND METHOD OF DRIVING MOTOR TO MOVE OBJECT AT A CONSTANT VELOCITY

CROSS-REFERENCE TO RELATED APPLICATIONS

The present document incorporates by reference the entire contents of Japanese priority documents, 2002-351767 filed in Japan on Dec. 3, 2002 and 2003-307332 filed in Japan on Aug. 29, 2003.

BACKGROUND OF THE INVENTION

1) Field of the Invention

The present invention relates to a drive control method and apparatus that controls the drive of a pulse motor so that a rotor driven by the pulse motor rotates at a constant angular velocity or a movable element driven by the pulse motor moves at a constant velocity, and to a belt device, an image forming apparatus, an image reading apparatus, and computer products.

2) Description of the Related Art

A drive control method disclosed in Japanese Patent No. 2754582 is a method of detecting an angular velocity of a transfer roller based on an output pulse signal of an encoder provided on a shaft of the transfer roller as a rotor. In this method, the drive of a pulse motor that rotates the transfer roller is controlled so that a detected value of the angular velocity coincides with a preset target value of the angular velocity.

A drive control method disclosed in Japanese Patent Application Laid Open No. 2000-047547 is a method of detecting an angular velocity of a driven roller based on an output pulse signal of an encoder provided on the driven roller as the rotor. The driven roller is turned by a drive roller through a belt that is wound around between the driven roller and the drive roller. In this method, the drive of a pulse motor that rotates the drive roller is controlled based on a detected value of the angular velocity and a preset target value of the angular velocity. By controlling the drive of the pulse motor based on the results of detecting the angular velocity of the rotors such as the transfer roller and the driven roller in the above manners, the rotors are controlled so as to rotate at a constant angular velocity.

Conventionally, in order to keep the drive status of a motor driver appropriate, a displacement is measured using an encoder to perform feedback control on the motor driver based on the result of measurement. A relation between the resolution of the encoder or a marker sensor and the magnitude of a variation component of a target to be controlled has been generally recognized by persons skilled in the art as follows. That is the displacement can be measured only after the encoder having the resolution finer than the double amplitude of the variation component of the target, is used. Moreover, in order to obtain practical measurement accuracy, it is desirable to use an encoder having the resolution sufficiently fine with respect to the variation of the target.

Therefore, the encoder or the marker sensor having the resolution sufficiently finer than the double amplitude of the variation component of the target has to be used. Because the resolution affects the image quality of a formed image or the reading accuracy unless a drive system to be used for conventional image forming apparatuses and image reading apparatuses is controlled accurately.

As explained above, in the drive control methods described in the above-mentioned patent documents, the angular velocity of the rotor such as the transfer roller and the driven roller is detected based on the output pulse signal of the encoder. The drive of the pulse motor is controlled so that the detected value approaches the target value of the angular velocity. When the drive of the pulse motor is controlled based on such a detected value, it is possible to control so that an error in the angular velocity of the rotor between control timings is reduced. However, the error cannot be eliminated perfectly. This is because if an error occurs in the angular velocity of the rotor, an error in an angular displacement of the rotor caused by the error in the angular velocity is cumulatively increased. Such an error in the angular displacement of the rotor causes the variation in an image size in the image forming apparatus that includes a photosensitive drum and a transfer roller as the rotor. The error may cause color misalignment when the color image forming apparatus that obtains a color image by superposing images of colors on one another.

There is a case where the control is performed so that a movable element driven by the pulse motor linearly moves at a constant velocity but not performed so that the rotor is rotated at a constant angular velocity. In this case, the velocity of the movable element is detected based on an output pulse signal of a sensor that detects a linear movement of the movable element. The drive of the pulse motor is then controlled so that a detected value of the velocity approaches a target value of the velocity. Even if the control is performed in such a manner, the error in the displacement of the movable element may be accumulated in the same manner as the case where the rotation of the rotor is controlled.

Furthermore, in such a conventional drive control apparatus, the encoder or the marker sensor, whose resolution is finer than the double amplitude of the variation component of the target to be controlled at all times, has to be used, which causes the cost of the high resolution encoder and marker sensor to be inevitably increased. Thus, the cost of the image forming apparatus and the image reading apparatus with the devices is increased naturally.

SUMMARY OF THE INVENTION

It is an object of the present invention to solve at least the problems in the conventional technology.

An image forming apparatus according to another aspect of the present invention includes an image carrier; a motor to move the image carrier; a movement measuring unit that measures an amount of movement of the image carrier; a movement difference calculator that calculates a difference between the amount of movement and a target value; and a motor controller that controls the motor so that the image carrier moves at a constant velocity, based on the difference.

An image reading apparatus according to still another aspect of the present invention includes an object including an optical system for image reading; a motor to move the object along a plane of a target to be read; a movement measuring unit that measures an amount of movement of the object; a movement difference calculator that calculates a difference between the amount of movement and a target value; and a motor controller that controls the motor so that the object moves at a constant velocity, based on the difference.

A method of driving a motor to move an object according to still another aspect of the present invention includes measuring an amount of movement of the object; calculating a difference between the amount of movement and a target value; and controlling the motor so that the object moves at a constant velocity, based on the difference.

A computer program product according to still another aspect of the present invention realizes the method according to the present invention on a computer.

The other objects, features and advantages of the present invention are specifically set forth in or will become apparent from the following detailed descriptions of the invention when read in conjunction with the accompanying drawings.

DETAILED DESCRIPTION

Exemplary embodiments of a drive control method and apparatus, a belt device, an image forming apparatus, an image reading apparatus, and a computer program according to the present invention are explained in detail below with reference to the accompanying drawings.

Figure 2:
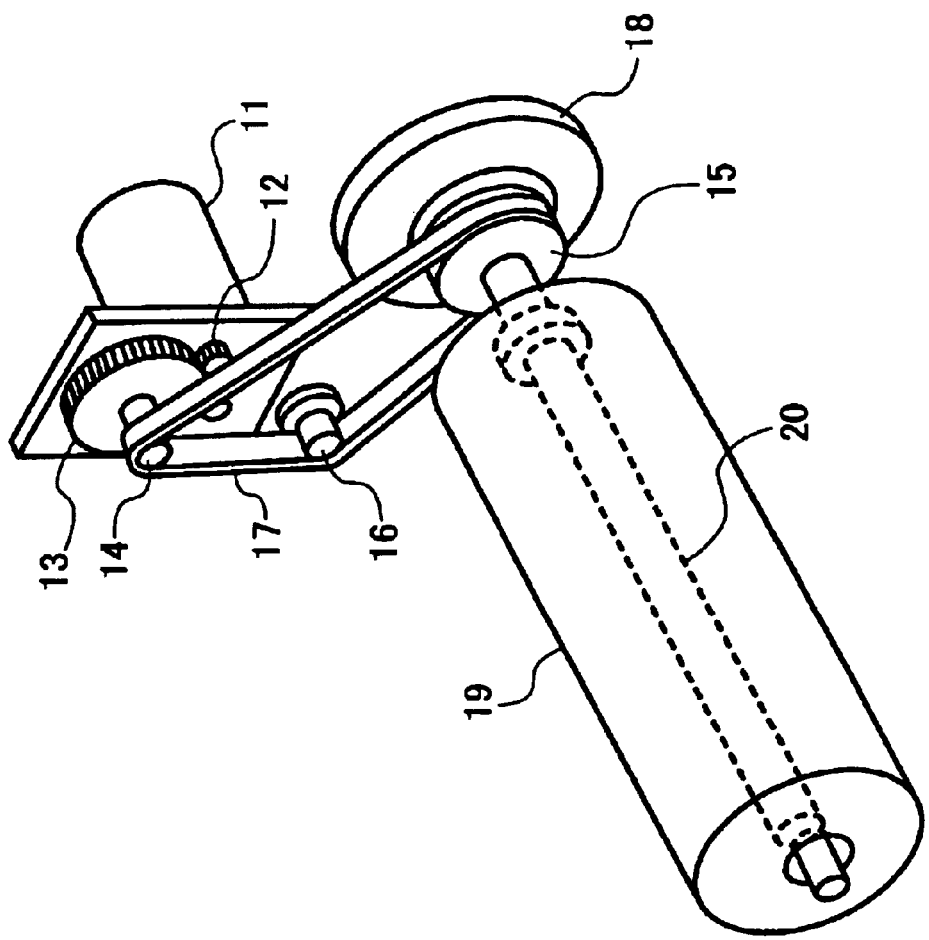
FIG. 2 is a perspective view of a rotor driver according to the first embodiment.

FIG. 2 is a perspective view of a rotor driver according to a first embodiment of the present invention. Rotational torque (drive force) of a pulse motor 11 as a rotation drive source is transmitted to a shaft 20 of a rotor 19 by gears 12 and 13, and a timing belt 17 that form a power transmission system. The timing belt 17 is wound around between a drive pulley 14 and a driven pulley 15, so that it is held under a constant tension by a tension pulley 16. The rotor 19 is fixed to the shaft 20 so that concentricity of the rotor 19 to the driven pulley 15 is maintained through the shaft 20. An encoder 18 as a unit for detecting an angular displacement of the rotor 19 is fixed to the shaft 20 of the rotor 19 through a coupling (not shown). An angular displacement of the shaft 20 detected by the encoder 18 is the same as that of the rotor 19.

Figure 3:
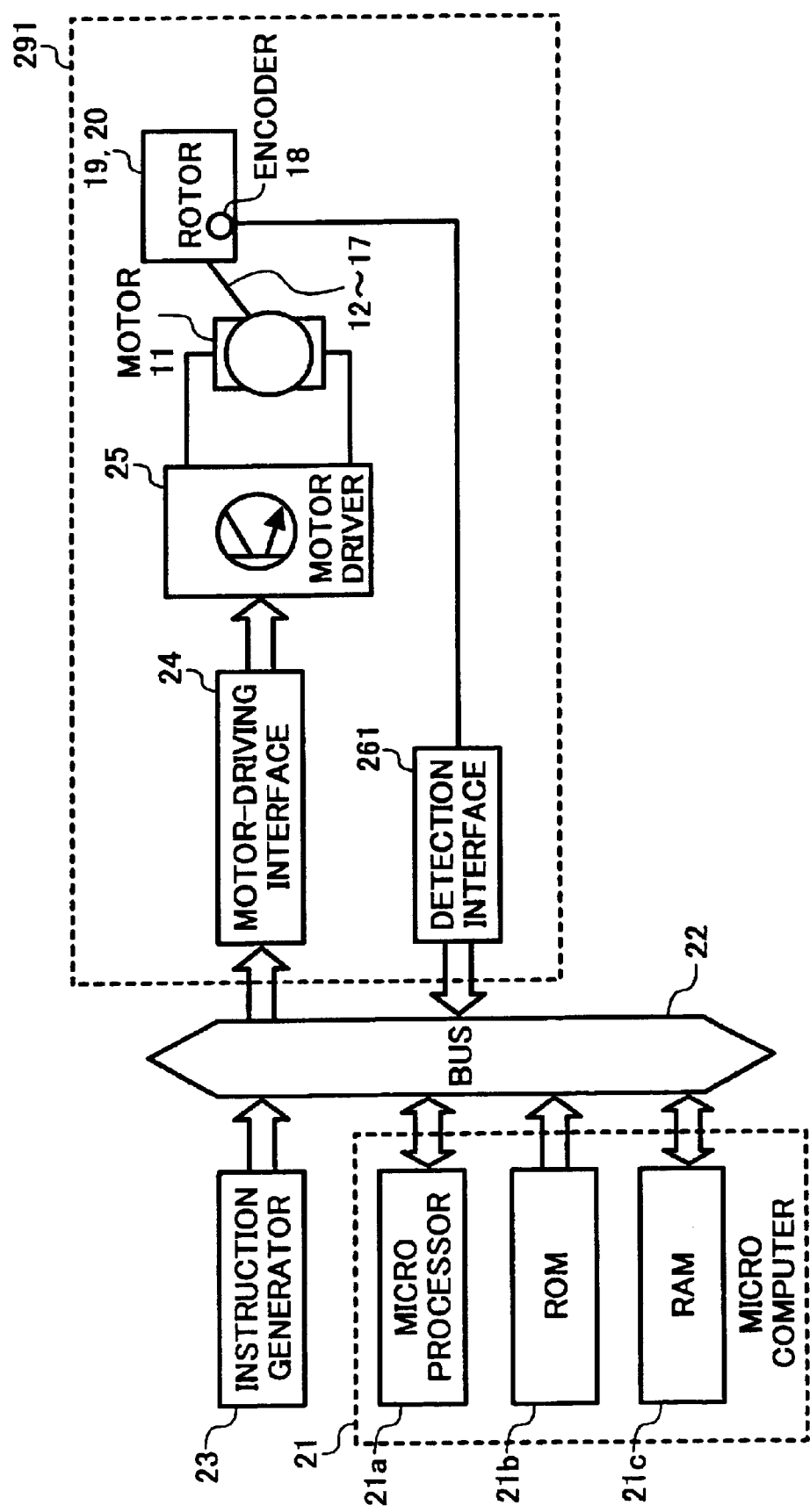
FIG. 3 is a block diagram of a hardware configuration of a control system of a pulse motor and a target to be controlled according to the first embodiment.

FIG. 3 is a block diagram of a hardware configuration of a control system of the pulse motor 11 and a target to be controlled according to the first embodiment. The control system digitally controls an angular displacement of the pulse motor 11 based on an output signal of the encoder 18. This control system includes a microcomputer 21, a bus 22, an instruction generator 23, an interface for driving a motor (hereinafter, "motor-driving interface") 24, a motor driver 25, and an interface for detection (hereinafter, "detection interface") 261.

The microcomputer 21 includes a microprocessor 21a, a read only memory (ROM) 21b, and a random access memory (RAM) 21c, which are connected to one another through the bus 22.

The instruction generator 23 outputs an instruction signal to instruct a drive frequency of a drive pulse signal to the pulse motor 11. The output side of the instruction generator 23 is also connected to the bus 22.

The detection interface 261 processes an output pulse of the encoder 18 to be converted to a digital value. This detection interface 261 includes a counter that counts output pulses of the encoder 18. The counter also multiplies a value counted in the counter by a conversion constant for a preset diagonal displacement of the number of pulses to convert a multiplied value to a digital value corresponding to the angular displacement of a motor shaft. The signal of the digital value corresponding to the angular displacement of the rotor 19 is transmitted to the microcomputer 21 through the bus 22.

The motor-driving interface 24 receives the instruction signal of the drive frequency transmitted from the instruction generator 23, and generates a pulsed control signal having the drive frequency.

The motor driver 25 includes a power semiconductor device (e.g., transistor). This motor driver 25 operates based on the pulsed control signal output from the motor-driving interface 24, and applies a pulsed drive voltage to the pulse motor 11. As a result, the pulse motor 11 is controlled by a predetermined drive frequency output from the instruction generator 23. Accordingly, variable value control is performed so that the angular displacement of the rotor 19 follows a target angular displacement, and the rotor 19 rotates at a predetermined constant angular velocity. The angular displacement of the rotor 19 is detected by the encoder 18 and the detection interface 261, and the detected value is input into the microcomputer 21, and the control is repeated.

A section indicated by reference numeral 291 of FIG. 3 is a target to be controlled including the whole rotor drive system, motor-driving interface 24, motor driver 25, and detection interface 261.

Figure 1:
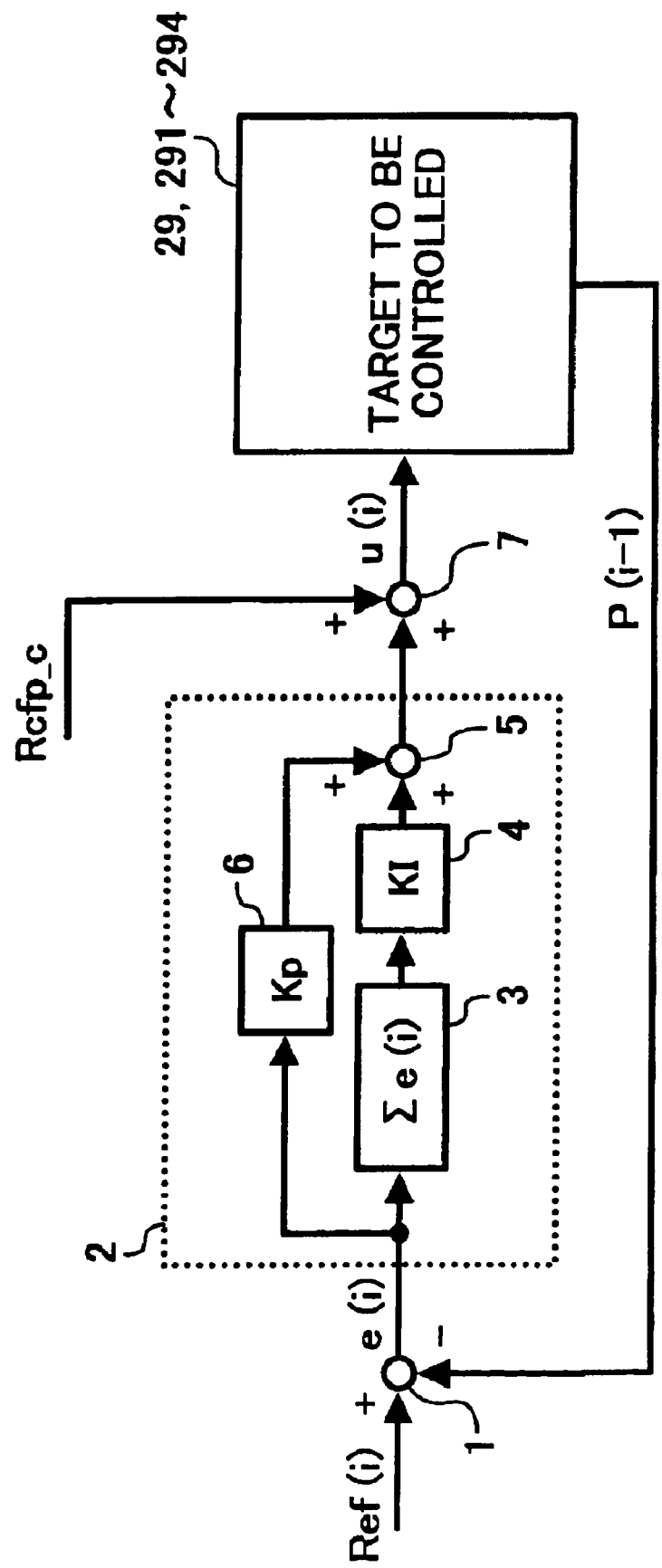
FIG. 1 is a block diagram of a drive control apparatus that executes a drive control method according to a first embodiment of the present invention.

FIG. 1 is a block diagram of a drive control apparatus that executes a drive control method according to the first embodiment. As shown in FIG. 1, information output from the detection interface 261, that is, information P(i−1) for an angular displacement of the rotor 19 (hereinafter, "detected angular displacement") is input to an arithmetic unit (subtractor) 1. The arithmetic unit 1 calculates a difference e(i) between a target value Ref(i) of an angular displacement of the rotor 19 (hereinafter, "target angular displacement") as a target control value and the detected angular displacement P(i−1) of the rotor 19. The difference e(i) is input to a controller 2.

The controller 2 includes, for example, a proportional-plus-integral (PI) control system. The difference e(i) calculated in the arithmetic unit 1 is integrated in an integral element 3, and is multiplied by a constant KI in a proportional element 4 (in other words, a multiplier), and multiplied value as a signal is input to an arithmetic unit 5. At the same time, the difference e(i) calculated in the arithmetic unit 1 is multiplied by a constant Kp in a proportional element 6 (in other words, a multiplier), and a multiplied value as a signal is input to the arithmetic unit (adder) 5.

The arithmetic unit 5 adds the two input signals from the proportional elements 4 and 6 to obtain a correction amount with respect to a reference drive pulse frequency used to drive the pulse motor 11, and inputs the correction amount to an arithmetic unit (adder) 7.

The arithmetic unit 7 adds the correction amount to the reference drive pulse frequency Refp_c to determine a drive pulse frequency u(i). A drive pulse signal is generated by the motor-driving interface 24 and the motor driver 25 based on the drive pulse frequency u(i) of the drive pulse signal, and the generated drive pulse signal is output to the pulse motor 11. The drive force of the pulse motor 11 controlled in the above manner is transferred to the rotor 19 through the drive transmission systems 12 to 17, and the rotor 19 rotates at the constant angular velocity according to the predetermined target angular displacement. The operation of controlling a feedback loop is repeated.

In the controller 2 of the first embodiment, the PI control system is used as one example, but the controller is not limited to this. All the calculations are performed through the numerical operation provided in the microcomputer 21, and therefore, the calculations are easily performed. Further, the reference drive pulse frequency Refp_c is the number of pulses that are uniquely determined based on the angular velocity of the rotor 19 and a deceleration ratio of a deceleration system. However, in the first embodiment, the number of pulses can be arbitrarily selected in a range in which loss of synchronism does not occur during driving of the motor. The target angular displacement Ref(i) can be easily obtained by integrating the target constant angular velocitys of the rotor 19.

Figure 4:
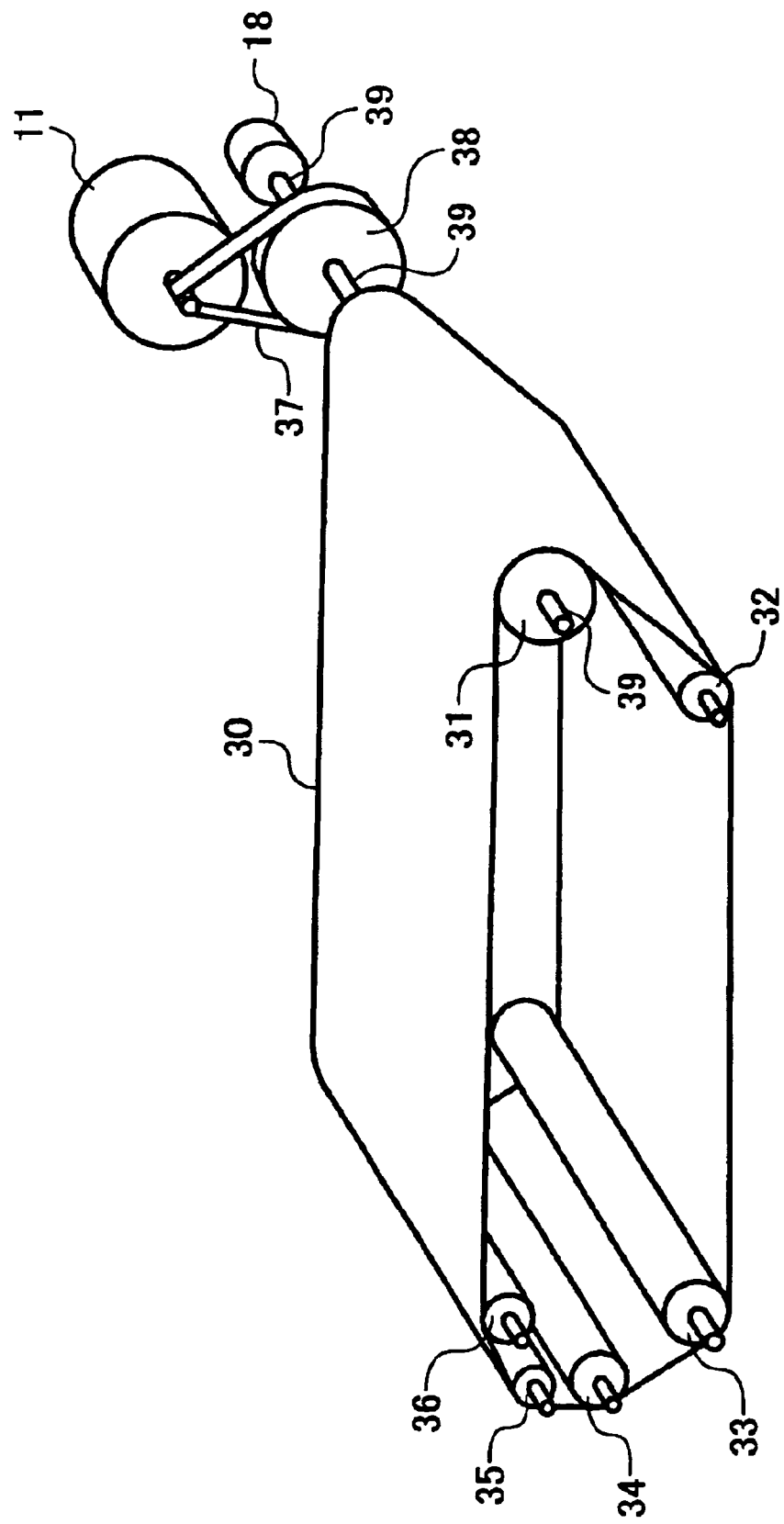
FIG. 4 is a perspective view of a rotor driver according to a second embodiment of the present invention.

FIG. 4 is a perspective view of a rotor driver according to a second embodiment of the present invention. The rotor driver is a belt device that drives the pulse motor 11 to make an endless belt 30 move at a predetermined constant velocity. The belt 30 is wound around among a drive roller 31 and driven rollers 32 to 36. As shown in FIG. 4, rotational torque (drive force) of the pulse motor 11 as a rotation drive source is transmitted to a drive shaft 39 of the drive roller 31 by a timing belt 37 and a driven pulley 38 as the deceleration system that forms the power transmission system. Transmission of the drive force of the pulse motor 11 to the drive roller 31 makes the belt 30 wound around the drive roller 31 move. In the second embodiment, an angular displacement of the drive roller 31 is detected. A unit of detecting the angular displacement is the encoder 18 fixed to the drive shaft 39 of the drive roller 31 through a coupling (not shown).

Figure 5:
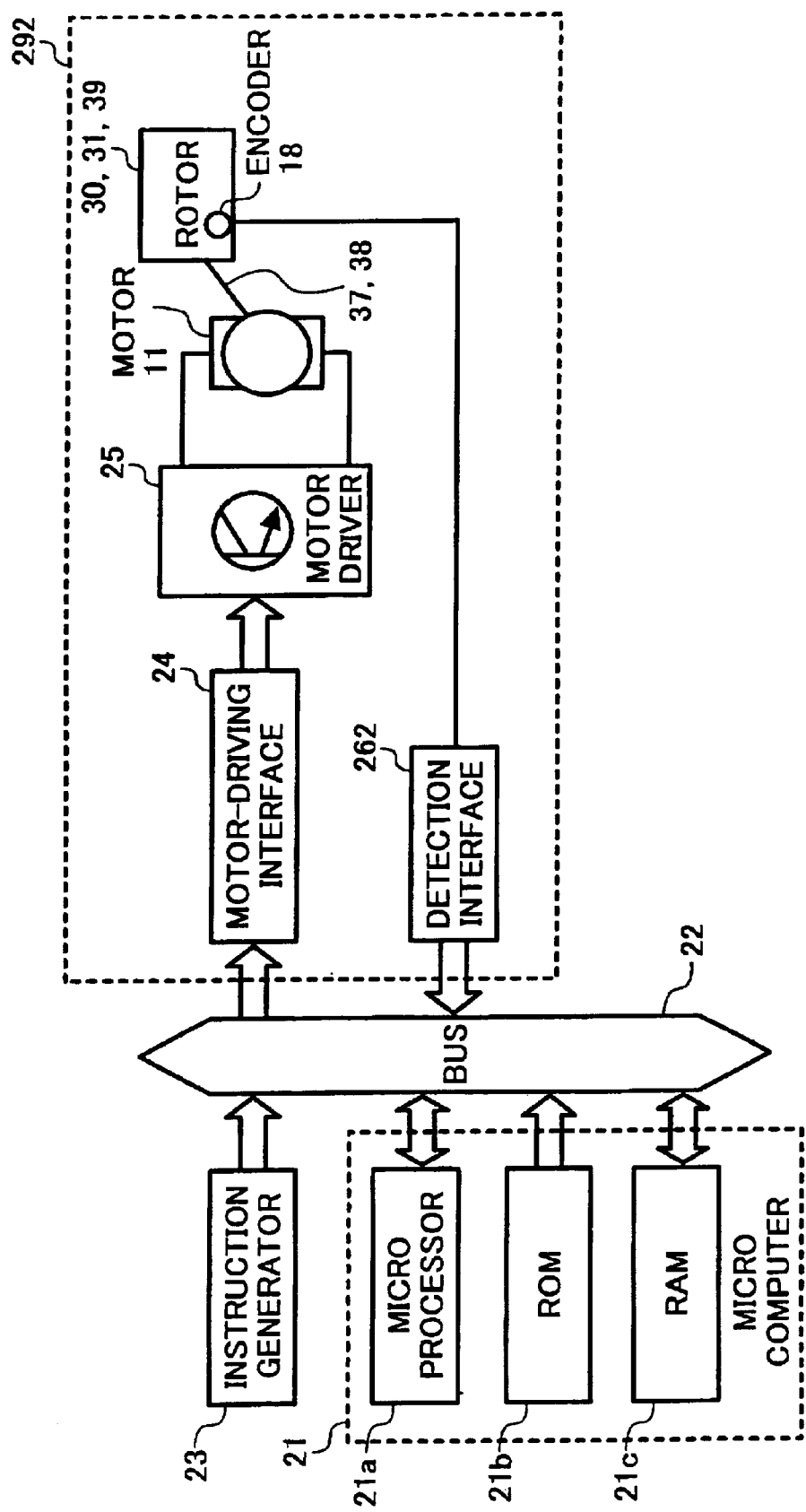
FIG. 5 is a block diagram of a hardware configuration of a control system of a pulse motor and a target to be controlled according to the second embodiment.

FIG. 5 is a block diagram of a hardware configuration of the control system of the pulse motor 11 and a target to be controlled according to the second embodiment. Reference numeral 292 of FIG. 5 represents the target including the whole rotor drive system, the motor-driving interface 24, the motor driver 25, and a detection interface 262.

The detection interface 262 processes an output pulse of the encoder 18 to be converted to a digital value. This detection interface 262 includes the counter that counts output pulses of the encoder 18, and multiplies a value counted in the counter by a conversion constant for a preset diagonal displacement of the number of pulses. This detection interface 262 also converts an obtained value to a digital value corresponding to an angular displacement of the drive roller 31. The signal of the digital value corresponding to the angular displacement of the drive roller 31 is transmitted to the microcomputer 21 through the bus 22.

The motor driver 25 operates based on a pulsed control signal output from the motor-driving interface 24, and applies a pulsed drive voltage to the pulse motor 11. As a result, the pulse motor 11 is driven with a predetermined drive frequency output from the instruction generator 23. Accordingly, the variable value control is performed so that the angular displacement of the drive roller 31 follows a target angular displacement, and the belt 30 wound around the drive roller 31 moves at a predetermined constant velocity. The angular displacement of the drive roller 31 is detected by the encoder 18 and the detection interface 262, and the detected value is input into the microcomputer 21, and the control is repeated.

A block diagram of the drive control apparatus that executes the drive control method according to the second embodiment is the same as FIG. 1 of the first embodiment. A detected angular displacement P(i−1) of the drive roller 31 output from the detection interface 262 is input to the arithmetic unit 1. The arithmetic unit 1 calculates a difference e(i) between a target angular displacement Ref(i) of the drive roller 31 as a target control value and the detected angular displacement P(i−1) of the drive roller 31. The difference e(i) is input to the controller 2.

The controller 2 includes, for example, the PI control system. The difference e(i) calculated in the arithmetic unit 1 is integrated in the integral element 3, and is multiplied by the constant KI in the proportional element 4, and a multiplied value as a signal is input to the arithmetic unit 5. At the same time, the difference e(i) calculated in the arithmetic unit 1 is multiplied by the constant Kp in the proportional element 6, and a multiplied value as a signal is input to the arithmetic unit (adder) 5.

The arithmetic unit 5 adds the two input signals from the proportional elements 4 and 6 to obtain a correction amount with respect to the reference drive pulse frequency used to drive the pulse motor 11, and inputs the correction amount to the arithmetic unit 7.

The arithmetic unit 7 adds the correction amount to the reference drive pulse frequency Refp_c to determine a drive pulse frequency u(i). A drive pulse signal is generated by the motor-driving interface 24 and the motor driver 25 based on the drive pulse frequency u(i) of the drive pulse signal, and the generated drive pulse signal is output to the pulse motor 11. The drive force of the pulse motor 11 controlled in the above manner is transferred to the drive shaft 39 of the drive roller 31 through the drive transmission systems 37 and 38, and the drive roller 31 rotates at the constant angular velocity according to the predetermined target angular displacement. As a result, the belt 30 moves at a predetermined constant velocity. The operation of controlling the feedback loop is repeated.

In the controller 2 of the second embodiment, the PI control system is also used as one example, but the controller is not limited to this. All the calculations are performed through the numerical operation provided in the microcomputer 21, and therefore, the calculations are easily performed. Further, the reference drive pulse frequency Refp_c is the number of pulses that are uniquely determined based on the angular velocity of the drive roller 31 and a deceleration ratio of the deceleration system that is obtained based on the velocity of the belt 30. However, in the second embodiment, the number of pulses can be arbitrarily selected in a range in which loss of synchronism does not occur during driving of the motor. The target angular displacement Ref(i) can be easily obtained by integrating the target constant angular velocities of the drive roller 31.

Figure 6:
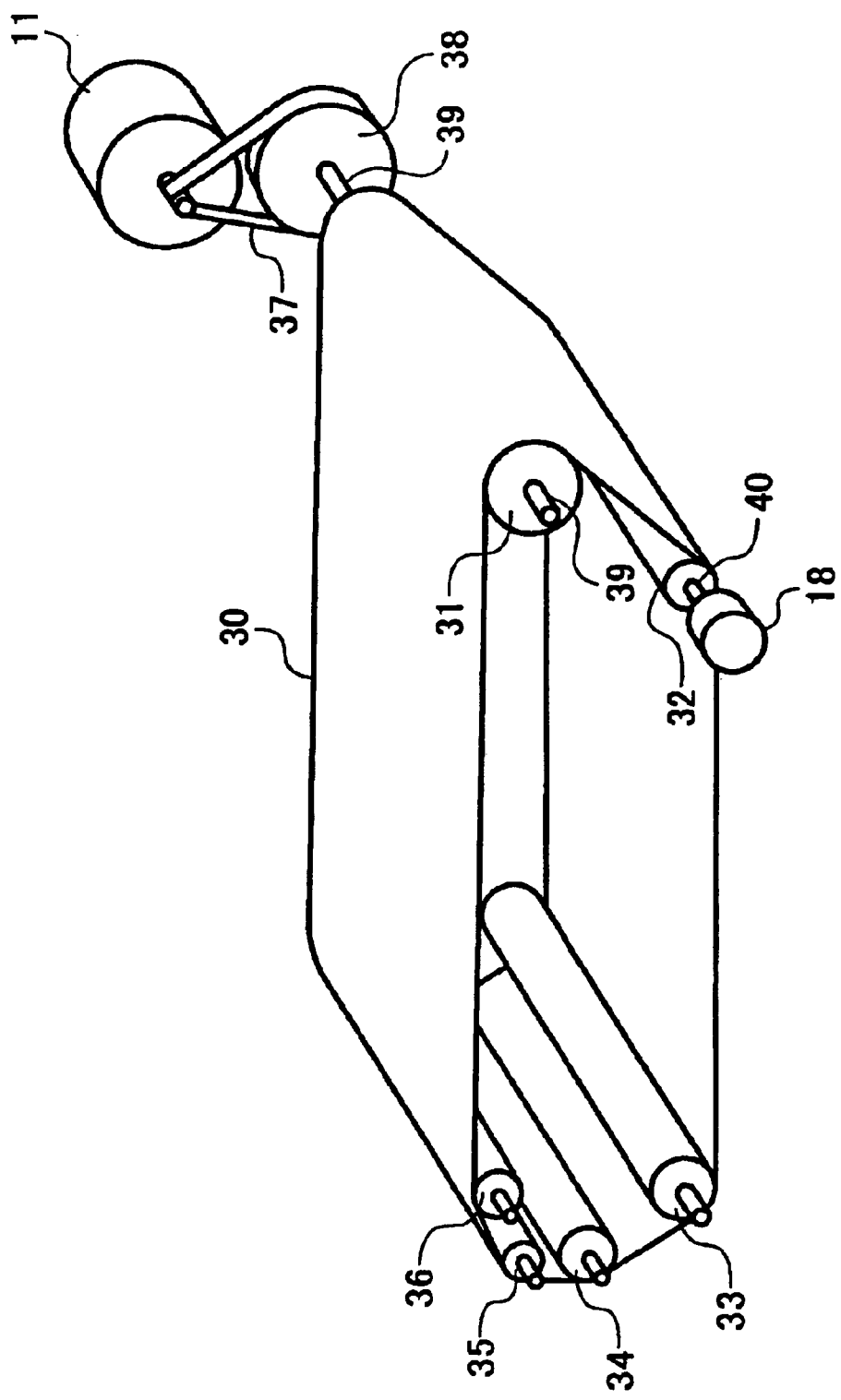
FIG. 6 is a perspective view of a rotor driver according to a third embodiment of the present invention.

FIG. 6 is a perspective view of a rotor driver according to a third embodiment of the present invention. The rotor driver is a belt device that drives the pulse motor 11 to make the belt 30 move at a predetermined constant velocity. The belt 30 is wound around among the drive roller 31 and the driven rollers 32 to 36. As shown in FIG. 6, rotational torque (drive force) of the pulse motor 11 as a rotation drive source is transmitted to the drive shaft 39 of the drive roller 31 by the timing belt 37 and the driven pulley 38 as the deceleration system that forms the power transmission system. Transmission of the drive force of the pulse motor 11 to the drive roller 31 makes the belt 30 wound around the drive roller 31 move. In the third embodiment, an angular displacement of the driven roller 32, of the driven rollers, located at a position close to the drive roller 31 is detected. A unit of detecting the angular displacement of the driven roller 32 is the encoder 18 fixed to a driven shaft 40 of the driven roller 32 through a coupling (not shown).

Figure 7:
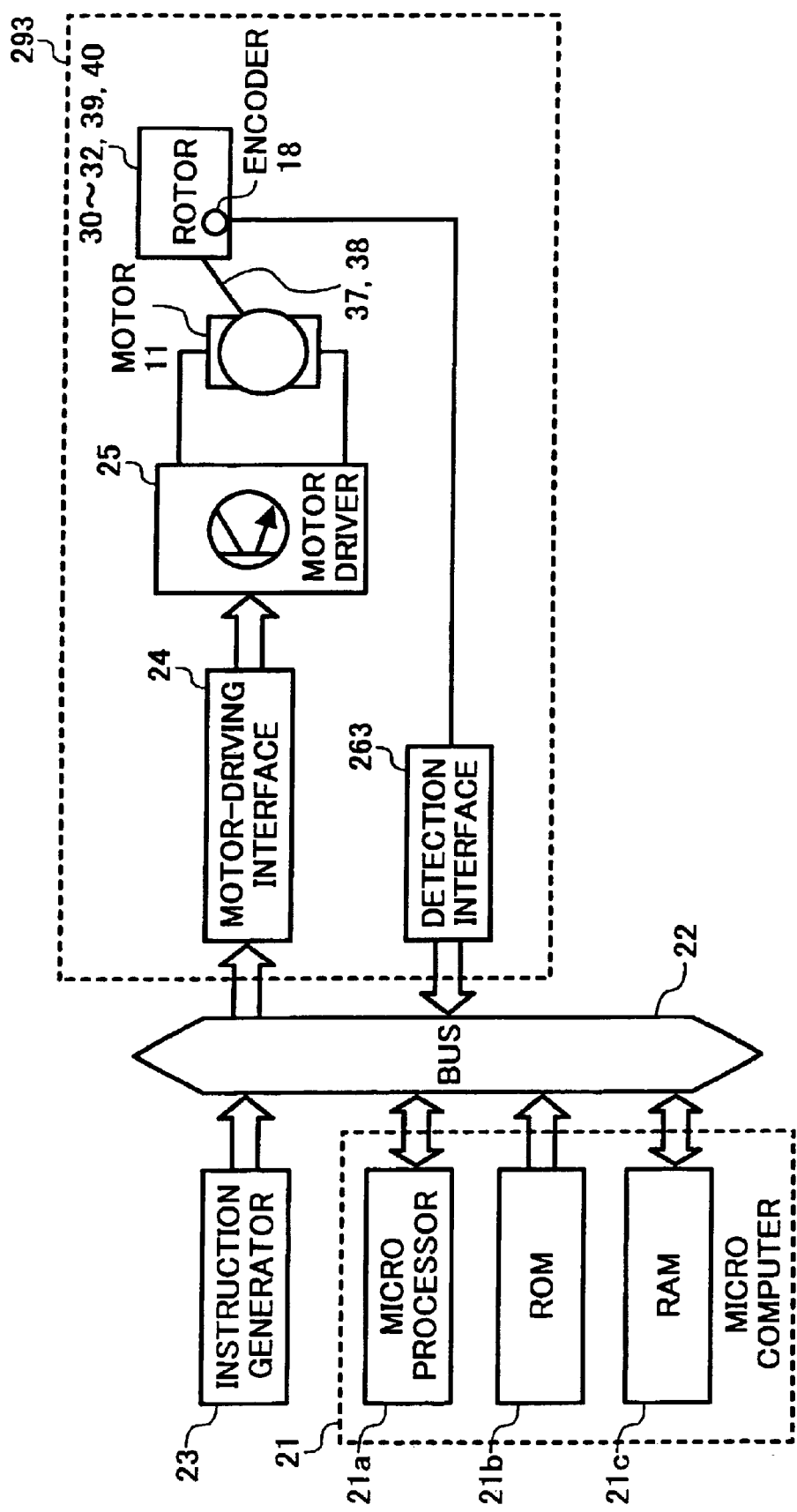
FIG. 7 is a block diagram of a hardware configuration of a control system of a pulse motor and a target to be controlled according to the third embodiment.

FIG. 7 is a block diagram of a hardware configuration of the control system of the pulse motor 11 and a target to be controlled according to the third embodiment. Reference numeral 293 of FIG. 7 represents the target including the whole rotor drive system, the motor-driving interface 24, the motor driver 25, and a detection interface 263.

The detection interface 263 processes an output pulse of the encoder 18 to be converted to a digital value. This detection interface 263 includes the counter that counts output pulses of the encoder 18, and multiplies a value counted in the counter by a conversion constant for a preset diagonal displacement of the number of pulses. The detection interface 263 also converts an obtained value to a digital value corresponding to an angular displacement of the driven roller 32. The signal of the digital value corresponding to the angular displacement of the driven roller 32 is transmitted to the microcomputer 21 through the bus 22.

The motor driver 25 operates based on a pulsed control signal output from the motor-driving interface 24, and applies a pulsed drive voltage to the pulse motor 11. As a result, the pulse motor 11 is driven with a predetermined drive frequency output from the instruction generator 23. Accordingly, the variable value control is performed so that the angular displacement of the driven roller 32 follows a target angular displacement, and the belt 30 wound around the driven roller 32 moves at a predetermined constant velocity. The angular displacement of the driven roller 32 is detected by the encoder 18 and the detection interface 263, and a detected value is input into the microcomputer 21, and the control is repeated.

A block diagram of the drive control apparatus that executes the drive control method according to the third embodiment is the same as FIG. 1 of the first embodiment. A detected angular displacement P(i−1) of the driven roller 32 output from the detection interface 263 is input to the arithmetic unit 1. The arithmetic unit 1 calculates a difference e(i) between the target angular displacement Ref(i) of the driven roller 32 as a target control value and the detected angular displacement P(i−1) of the driven roller 32. The difference e(i) is input to the controller 2.

The controller 2 includes, for example, the PI control system. The difference e(i) calculated in the arithmetic unit 1 is integrated in the integral element 3, and is multiplied by the constant KI in the proportional element 4, and a multiplied value as a signal is input to the arithmetic unit 5. At the same time, the difference e(i) calculated in the arithmetic unit 1 is multiplied by the constant Kp in the proportional element 6, and a multiplied value as a signal is input to the arithmetic unit 5.

The arithmetic unit 5 adds the two input signals from the proportional elements 4 and 6 to obtain a correction amount with respect to the reference drive pulse frequency used to drive the pulse motor 11, and inputs the correction amount to the arithmetic unit 7.

The arithmetic unit 7 adds the correction amount to the reference drive pulse frequency Refp_c to determine a drive pulse frequency u(i). A drive pulse signal is generated by the motor-driving interface 24 and the motor driver 25 based on the drive pulse frequency u(i) of the drive pulse signal, and the generated drive pulse signal is output to the pulse motor 11. The drive force of the pulse motor 11 controlled in the above manner is transferred to the drive shaft 39 of the drive roller 31 through the drive transmission systems 37 and 38, and the drive roller 31 rotates at a constant angular velocity according to the predetermined target angular displacement. As a result, the belt 30 moves at a predetermined constant velocity, and the driven roller 32 rotates at a predetermined constant angular velocity. The operation of controlling the feedback loop is repeated.

In the controller 2 of the third embodiment, the PI control system is also used as one example, but the controller is not limited to this. All the calculations are performed through the numerical operation provided in the microcomputer 21, and therefore, the calculations are easily performed. Further, the reference drive pulse frequency Refp_c is the number of pulses that are uniquely determined based on the angular velocity of the drive roller 31 and a deceleration ratio of the deceleration system that is obtained based on the velocity and drive radius of the belt 30. However, in the third embodiment, the number of pulses can be arbitrarily selected in a range in which loss of synchronism does not occur during driving of the motor. The target angular displacement Ref(i) can be easily obtained by integrating the target constant angular velocities of the driven roller 32.

Figure 8:
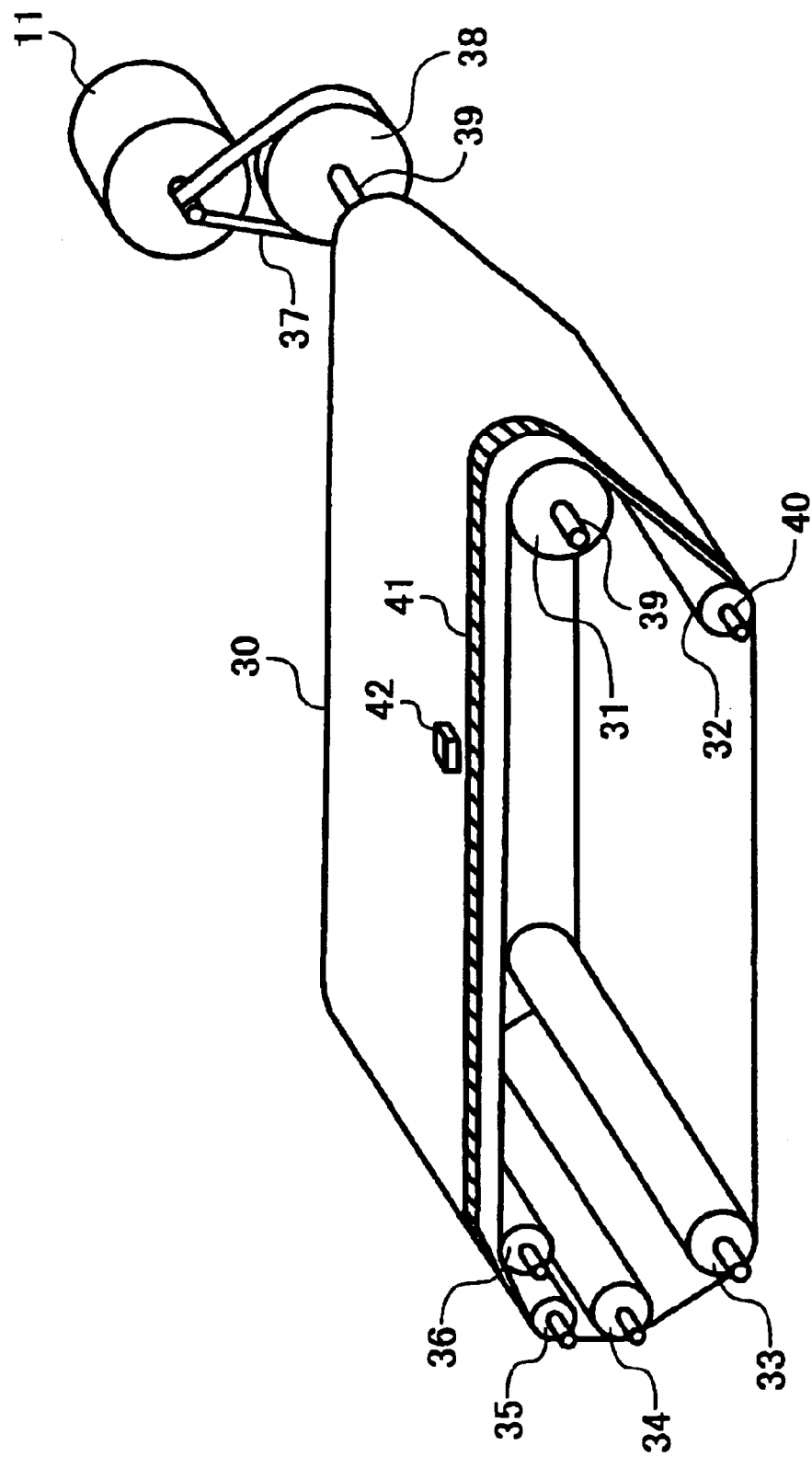
FIG. 8 is a perspective view of a rotor driver according to a fourth embodiment of the present invention.

FIG. 8 is a perspective view of a rotor driver according to a fourth embodiment of the present invention. The rotor driver is a belt device that drives the pulse motor 11 to make the belt 30 move at a predetermined constant velocity. The belt 30 is wound around among the drive roller 31 and the driven rollers 32 to 36. As shown in FIG. 8, rotational torque (drive force) of the pulse motor 11 as a rotation drive source is transmitted to the drive shaft 39 of the drive roller 31 by the timing belt 37 and the driven pulley 38 as the deceleration system that forms the power transmission system. Transmission of the drive force of the pulse motor 11 to the drive roller 31 makes the belt 30 wound around the drive roller 31 move.

In the fourth embodiment, a displacement of the surface of the belt 30 is detected. A unit of detecting the displacement of the surface of the belt 30 includes a marker 41 that is formed at one edge of the belt 30 in its lateral direction, and a marker sensor 42 disposed at a position that faces the marker 41 on the surface of the belt 30. The marker 41 is constantly formed at predetermined pitches along the direction of the belt movement. The marker sensor 42 includes a photo interrupter, and outputs a digital signal of "1" when the marker 41 arrives at a detection position and faces the marker sensor 42. The marker sensor 42 outputs a digital signal of "0" when a space between the markers 41 arrives at the detection position and faces the marker sensor 42. By counting the digital signals from the marker sensor 42, the displacement of the surface of the belt 30 can be detected.

Figure 9:
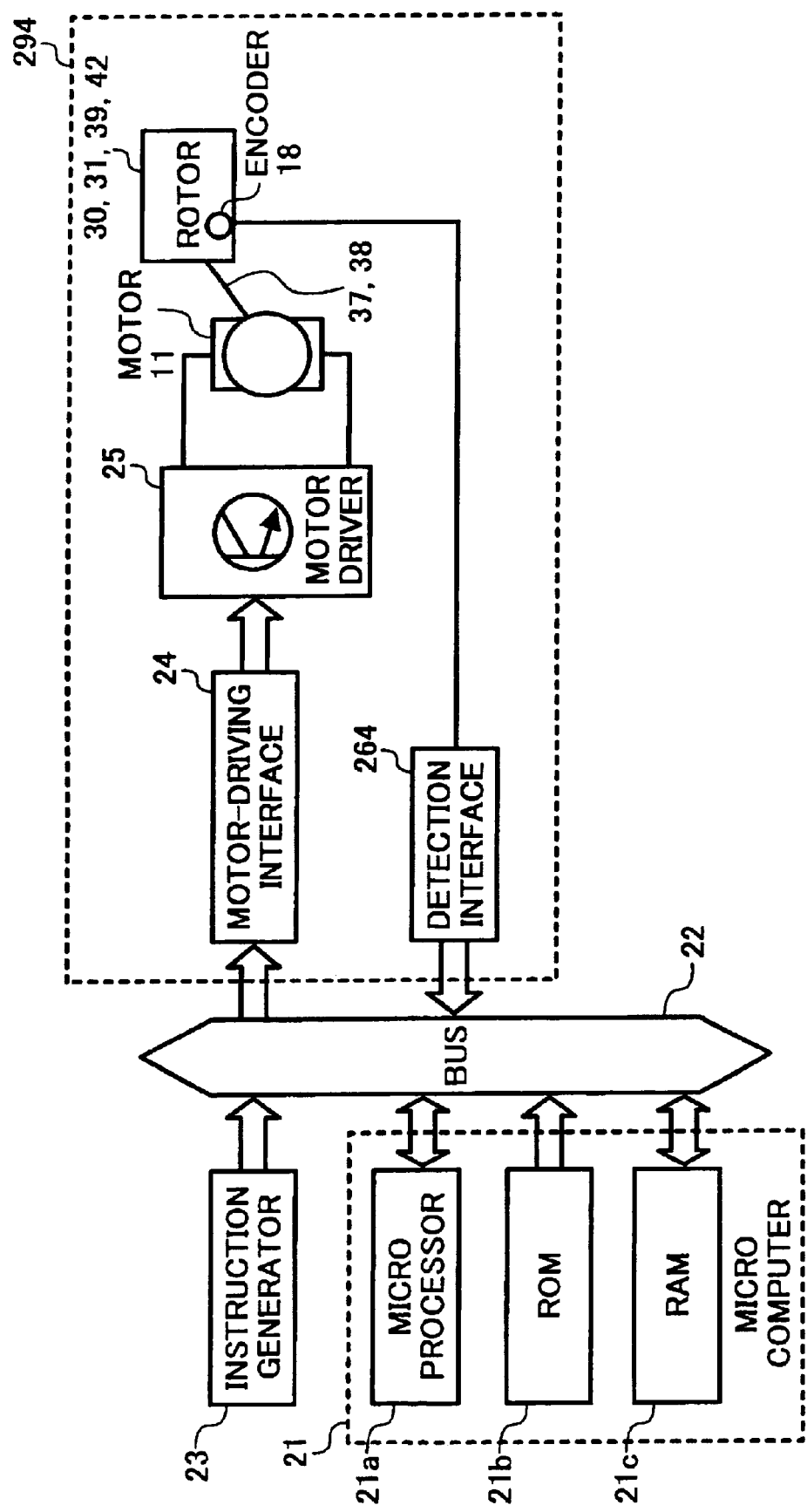
FIG. 9 is a block diagram of a hardware configuration of a control system of a pulse motor and a target to be controlled according to the fourth embodiment.

FIG. 9 is a block diagram of a hardware configuration of the control system of the pulse motor 11 and a target to be controlled according to the fourth embodiment. Reference numeral 294 of FIG. 9 represents the target including the whole rotor drive system, the motor-driving interface 24, the motor driver 25, and a detection interface 264.

The detection interface 264 processes an output pulse of the marker sensor 42 to be converted to a digital value. This detection interface 264 includes the counter that counts output pulses of the marker sensor 42, and multiplies a value counted in the counter by a preset conversion constant for a diagonal displacement of the number of pulses, and converts a multiplied value to a digital value corresponding to a displacement of the belt 30. The signal of the digital value corresponding to the displacement of the belt 30 is transmitted to the microcomputer 21 through the bus 22.

The motor driver 25 operates based on a pulsed control signal output from the motor-driving interface 24, and applies a pulsed drive voltage to the pulse motor 11. As a result, the pulse motor 11 is driven with a predetermined drive frequency output from the instruction generator 23. Accordingly, the variable value control is performed so that the displacement of the surface of the belt 30 follows, a target displacement, and the belt 30 moves at a predetermined constant velocity. The displacement of the surface of the belt 30 is detected by the marker sensor 42 and the detection interface 264, and a detected value is input into the microcomputer 21, and the control is repeated.

A block diagram of the drive control apparatus that executes the drive control method according to the fourth embodiment is the same as FIG. 1 of the first embodiment. A detected displacement P(i−1) of the belt 30 output from the detection interface 264 that processes the output pulse signal of the marker sensor 42 is input to the arithmetic unit 1. The arithmetic unit 1 calculates a difference e(i) between the target displacement Ref(i) of the belt 30 as a target control value and the detected displacement P(i−1) of the belt 30. The difference e(i) is input to the controller 2.

The controller 2 includes, for example, the PI control system. The difference e(i) calculated in the arithmetic unit 1 is integrated in the integral element 3, and is multiplied by the constant KI in the proportional element 4, and a multiplied value as a signal is input to the arithmetic unit 5. At the same time, the difference e(i) calculated in the arithmetic unit 1 is multiplied by the constant Kp in the proportional element 6, and a multiplied value as a signal is input to the arithmetic unit 5.

The arithmetic unit 5 adds the two input signals from the proportional elements 4 and 6 to obtain a correction amount with respect to the reference drive pulse frequency used to drive the pulse motor 11, and inputs the correction amount to the arithmetic unit 7.

The arithmetic unit 7 adds the correction amount to the reference drive pulse frequency Refp_c to determine a drive pulse frequency u(i). A drive pulse signal is generated by the motor-driving interface 24 and the motor driver 25 based on the drive pulse frequency u(i) of the drive pulse signal, and the generated drive pulse signal is output to the pulse motor 11. The drive force of the pulse motor 11 controlled in the above manner is transferred to the drive shaft 39 of the drive roller 31 through the drive transmission systems 37 and 38, and the belt 30 moves at a constant velocity according to the predetermined target displacement. As a result, the belt 30 moves at a predetermined constant velocity. The operation of controlling the feedback loop is repeated.

In the controller 2 of the fourth embodiment, the PI control system is used as one example, but the controller is not limited to this. All the calculations are performed through the numerical operation provided in the microcomputer 21, and therefore, the calculations are easily performed. Further, the reference drive pulse frequency Refp_c is the number of pulses that are uniquely determined based on the angular velocity of the drive roller 31 and a deceleration ratio of the deceleration system that is obtained based on the velocity and drive radius of the belt 30. However, in the fourth embodiment, the number of pulses can be arbitrarily selected in a range in which loss of synchronism does not occur during driving of the motor. The target displacement Ref(i) can be easily obtained by integrating target constant velocities of the driven roller 32.

Figure 10:
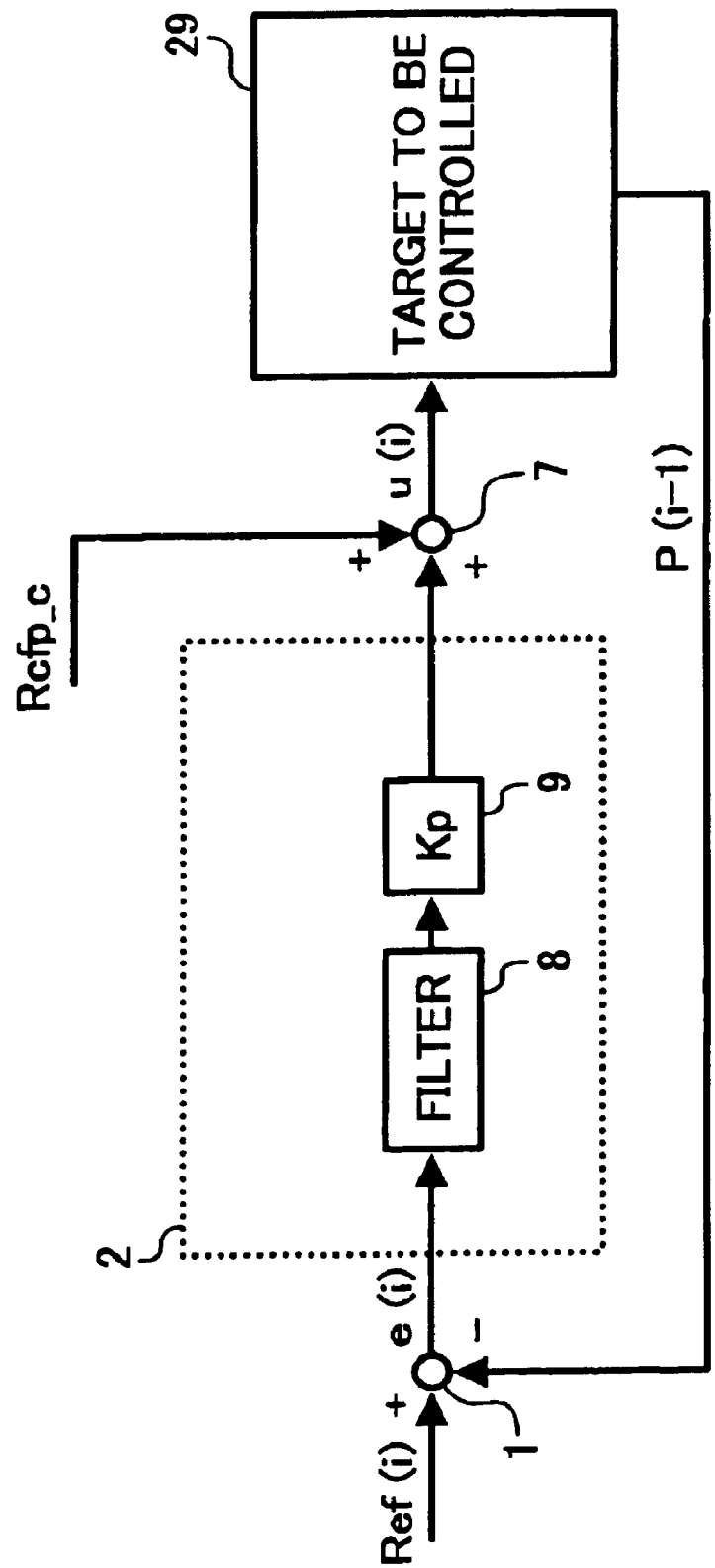
FIG. 10 is a block diagram of a drive control apparatus that executes a drive control method according to a fifth embodiment of the present invention.

FIG. 10 is a block diagram of a drive control apparatus that executes a drive control method according to a fifth embodiment of the present invention. A case where the drive control apparatus of the fifth embodiment is applied to the rotor driver of the first embodiment is explained below. However, the drive control apparatus of the fifth embodiment can be applied also to the belt devices of the second to fourth embodiments.

As shown in FIG. 10, a difference e(i) between the target angular displacement Ref(i) of the rotor 19 and the detected angular displacement P(i−1) of the rotor 19 is input to the controller 2. The controller 2 includes a low-pass filter 8 that removes high-frequency noise and a proportional element (gain Kp) 9 (in other words, a multiplier). The controller 2 obtains a correction amount with respect to the reference drive pulse frequency used to drive the pulse motor 11, and inputs the correction amount to the arithmetic unit 7. The arithmetic unit 7 adds the correction amount to the reference drive pulse frequency Refp_c to determine a drive pulse frequency u(i).

Figure 11:
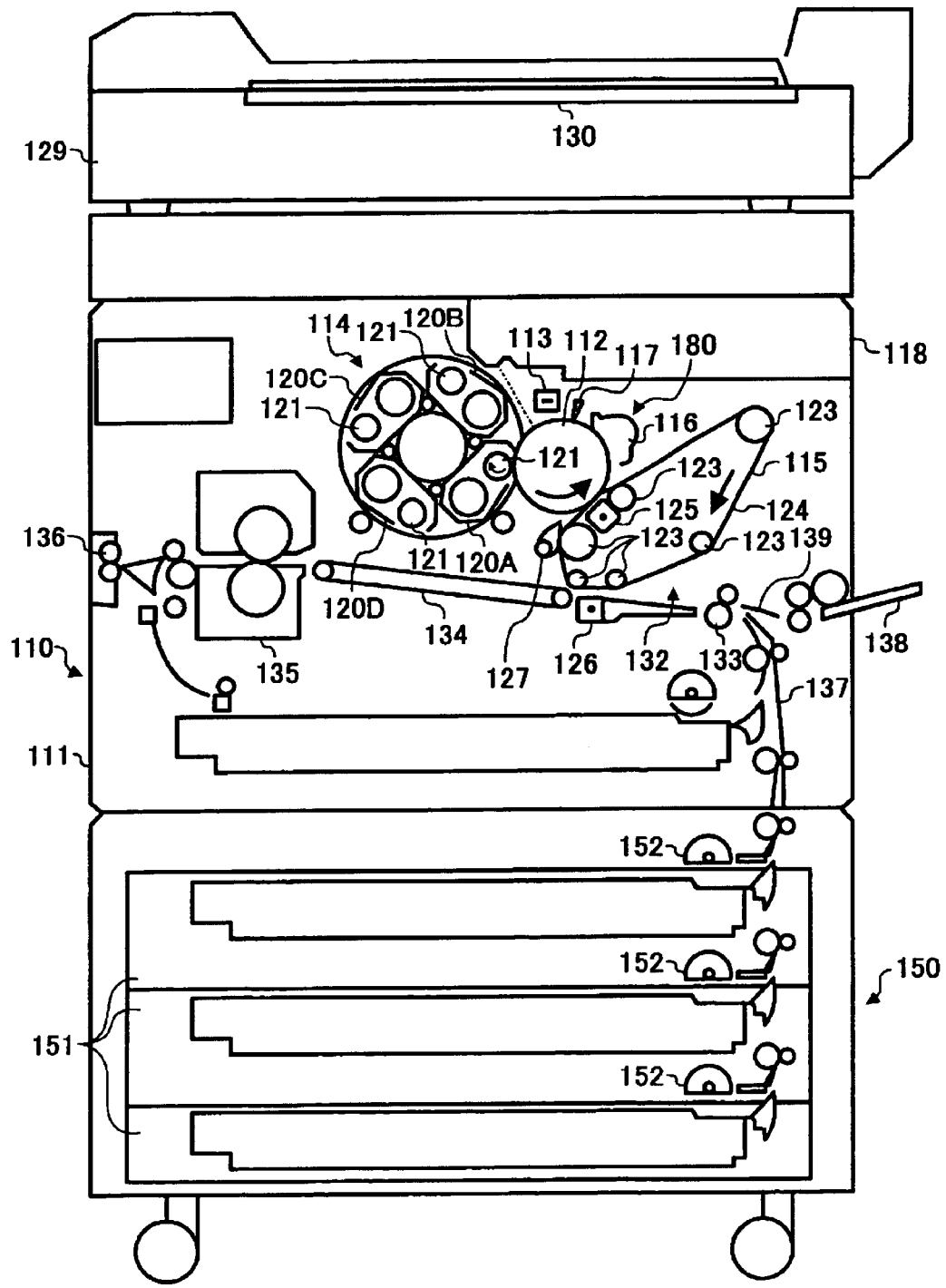
FIG. 11 is a schematic diagram of a color copying machine according to a sixth embodiment of the present invention.

FIG. 11 is a schematic diagram of a color copying machine as the image forming apparatus according to a sixth embodiment of the present invention. A body 110 of a color copying machine of the sixth embodiment includes a drum-shaped photosensitive element 112 (hereinafter, "photosensitive drum 112") as a latent image carrier provided in a position little to the right than a central part in an external case 111. Provided around the photosensitive drum 112 are a charger 113, a revolver type developing device 114, an intermediate transfer unit 115, a cleaning device 116, and a decharger 117 in the direction of the rotation of the photosensitive drum 112 (counterclockwise).

An optical write device as an exposing unit, for example, a laser write device 118 is disposed above the charger 113, developing device 114, cleaning device 116, and the decharger 117. The developing device 114 includes developing units 120A, 120B, 120C, and 120D each having a developing roller 121. These developing units 120A, 120B, 120C, and 120D contain toners of yellow, magenta, cyan, and black colors, respectively, and are rotated around a central axis to allow selected one of them to move to a developing position that faces the outer circumference of the photosensitive drum 112.

The intermediate transfer unit 115 includes a plurality of rollers 123 and an intermediate transfer belt 124 as an endless intermediate transfer element that is wound around among the rollers 123, and the transfer belt 124 is in contact with the photosensitive drum 112. A transfer device 125 is provided inside the transfer belt 124, and a transfer device 126 and a cleaning device 117 are provided outside the transfer belt 124. The cleaning device 117 is provided so that it is movable with respect to the transfer belt 124.

The laser write device 118 receives color image signals from an image reading apparatus 129 through an image processor (not shown). The photosensitive drum 112 that has been constantly charged is radiated with laser light L sequentially modulated by the color image signals to expose the photosensitive drum 112, and an electrostatic latent image is formed on the photosensitive drum 112. The image reading apparatus 129 separates colors of an image of a document placed on a document table 130 provided on the top surface of the body 110, and reads the image to be converted to electrical image signals. A recording-material conveying path 132 conveys a recording material such as paper from the right to the left. A registration roller pair 133 is provided on the right side as the upstream side of the intermediate transfer unit 115 and the transfer device 126 in FIG. 11. A conveying belt 134, a fixing device 135, and paper discharge rollers 136 are provided on the downstream side of the intermediate transfer unit 115 and the transfer device 126.

The body 110 is placed on the paper feed device 150 in which a plurality of paper feed cassettes 151 are provided in multiple stage. One of paper feed rollers 152 is selectively driven and a recording material in any of the paper feed cassettes 151 is sent out. The recording material is conveyed to the recording-material conveying path 132 through an automatic paper feed path 137 in the body 110. A manual feed tray 138 is provided on the right side of the body 110 so that it can be opened and closed. A recording material inserted from the manual feed tray 138 is conveyed to the recording-material conveying path 132 through a manual feed path 139 in the body 110. A paper discharge tray (not shown) is detachably attached to the left side of the body 110, and the recording material discharged through the recording-material conveying path 132 by the paper discharge rollers 136 is accommodated in the paper discharge tray.

When color copying is to be performed using the color copying machine of the sixth embodiment, a document is placed on the document table 130, a start switch (not shown) is pressed, and a copying operation is started. The image reading apparatus 129 performs color separation of the image of the document and reads the colors. At the same time, a recording material is selectively sent out by the paper feed roller 152 from any of the paper feed cassettes 151, and is conveyed through the automatic paper feed path 137 and the recording-material conveying path 132 and abuts on the registration roller pair 133 and stops.

The photosensitive drum 112 rotates in the counterclockwise, and the transfer belt 124 rotates in the clockwise by the rotation of the drive roller of the rollers 123. The photosensitive drum 112 is constantly charged by the charger 113 with its rotation, and is radiated with laser light modulated by a first-color image signal input to the laser write device 118 to form an electrostatic latent image. More specifically, the first-color image signal is input to the laser write device 118 from the image reading apparatus 129 through the image processor.

The electrostatic latent image on the photosensitive drum 112 is developed by a first-color developing unit 120A of the developing device 114, and a first-color image is formed. The first-color image on the photosensitive drum 112 is transferred to the transfer belt 124 by the transfer device 125. The photosensitive drum 112 is cleaned by the cleaning device 116 after the first-color image is transferred so that residual toner on the photosensitive drum 112 is removed, and the photosensitive drum 112 is decharged by the decharger 117.

Subsequently, the photosensitive drum 112 is constantly charged by the charger 113, and is radiated with laser light modulated by a second-color image signal input to the laser write device 118 to form an electrostatic latent image. More specifically, the second-color image signal is input to the laser write device 118 from the image reading apparatus 129 through the image processor.

The electrostatic latent image on the photosensitive drum 112 is developed by a second-color developing unit 120B of the developing device 114, and a second-color image is formed. The second-color image on the photosensitive drum 112 is transferred superposedly to the first-color image on the transfer belt 124 by the transfer device 125. The photosensitive drum 112 is cleaned by the cleaning device 116 after the second-color image is transferred so that toner remaining on the photosensitive drum 112 is removed, and the photosensitive drum 112 is decharged by the decharger 117.

Next, the photosensitive drum 112 is constantly charged by the charger 113, and is radiated with laser light modulated by a third-color image signal input to the laser write device 118 to form an electrostatic latent image. More specifically, the third-color image signal is input to the laser write device 118 from the image reading apparatus 129 through the image processor.

The electrostatic latent image on the photosensitive drum 112 is developed by a third-color developing unit 120C of the developing device 114, and a third-color image is formed. The third-color image on the photosensitive drum 112 is transferred superposedly to the first-color image and the second-color image on the transfer belt 124 by the transfer device 125. The photosensitive drum 112 is cleaned by the cleaning device 116 after the third-color image is transferred so that toner remaining on the photosensitive drum 112 is removed, and the photosensitive drum 112 is decharged by the decharger 117.

Furthermore, the photosensitive drum 112 is constantly charged by the charger 113, and is radiated with laser light modulated by a fourth-color image signal input to the laser write device 118 to form an electrostatic latent image. More specifically, the fourth-color image signal is input to the laser write device 118 from the image reading apparatus 129 through the image processor.

The electrostatic latent image on the photosensitive drum 112 is developed by a fourth-color developing unit 120D of the developing device 114, and a fourth-color image is formed. The fourth-color image on the photosensitive drum 112 is transferred superposedly to the first-color, second-color, and third-color images on the transfer belt 124 by the transfer device 125 to form a full color image. The photosensitive drum 112 is cleaned by the cleaning device 116 after the fourth-color image is transferred so that toner remaining on the photosensitive drum 112 is removed, and the photosensitive drum 112 is decharged by the decharger 117.

The registration roller pair 133 rotates at a timing to send out a recording material, and the full color image on the transfer belt 124 is transferred to the recording material by the transfer device 126. The recording material with the full color image is conveyed by the conveying belt 134 to the fixing device 135, where the full color image is fixed thereon, and the recording material with the fixed full color image is discharged by the discharge roller 136 to the paper discharge tray. The transfer belt 124 is cleaned by the cleaning device 127 after the full color image is transferred so that toner remaining on the belt is removed.

The operation of forming the four-color superposed images is explained. However, if three-color superposed images are to be formed, three different single-color images are sequentially formed on the photosensitive drum 112, and are transferred superposedly to the transfer belt 124 one by one. The superposed images are collectively transferred to the recording material. If two-color superposed images are to be formed, two different single-color images are sequentially formed on the photosensitive drum 112, and are transferred superposedly to the transfer belt 124 one by one. The superposed images are collectively transferred to the recording material. Alternatively, if a single-color image is to be formed, one single-color image is formed on the photosensitive drum 112, transferred to the transfer belt 124, and then the transferred image is transferred to the recording material.

In such a color copying machine, the rotational accuracy of the photosensitive drum 112 and the transfer belt 124 largely affects the quality of the final image. Therefore, in the color copying machine of the sixth embodiment, the photosensitive drum 112 is driven by the rotor driver as shown in FIG. 2 in order to rotate the photosensitive drum 112 highly accurately. Likewise, in order to rotate the transfer belt 124 highly accurately, the drive roller of the rollers 123, among which the transfer belt 124 is wound around, is driven by the belt device as shown in any of FIG. 4, FIG. 6, or FIG. 8. The rotor driver and the belt device are controlled by the drive control apparatus according to any of the first to fifth embodiments.

Figure 12:
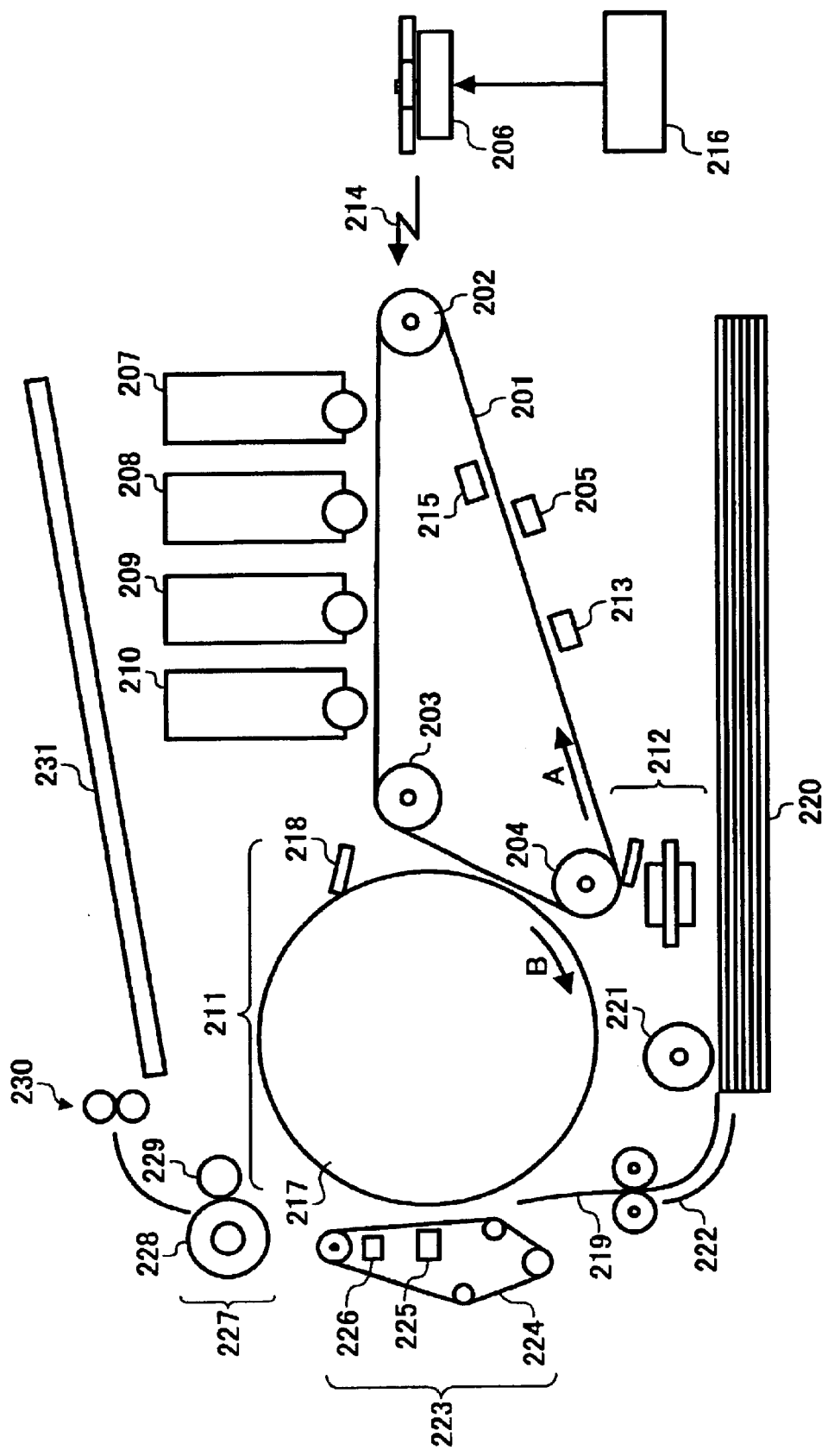
FIG. 12 is a schematic diagram of a color copying machine according to a seventh embodiment of the present invention.

FIG. 12 is a schematic diagram of a color copying machine as an image forming apparatus according to a seventh embodiment of the present invention. A photosensitive belt 201 as a latent image carrier is an endless photosensitive belt with a thin photosensitive layer. The thin photosensitive layer is made of an organic photosemiconductor (OPC) and is formed on the outer circumferential surface of a closed loop-shaped NL belt material. The photosensitive belt 201 is supported by three photosensitive-belt conveying rollers 202 to 204 as support rotors, and is rotated by a drive motor (not shown) in the direction of the arrow A.

Provide around the photosensitive belt 201 are a charger 205, an exposure optical system, i.e., a laser scanner unit (hereinafter, "LSU") 206 as an exposing unit, developing units 207 to 210 for black, yellow, magenta, and cyan, an intermediate transfer unit 211, a photosensitive-belt cleaning unit 212, and a decharger 213 in the direction of the rotation of the photosensitive belt indicated by the arrow A. The charger 205 is applied with a high voltage of about −4 to 5 kilovolts from a power source (not shown) to charge a portion of the photosensitive belt 201 that faces the charger 205, and the portion is constantly charged.

In the LSU 206, optical intensity modulation and pulse width modulation are performed sequentially on respective color image signals input from a gradation converter (not shown) by a laser drive circuit (not shown) to output a modulated signal, and semiconductor laser (not shown) is driven with the modulated signal to obtain exposure light 214. The photosensitive belt 201 is scanned with the exposure light 214 to sequentially form electrostatic latent images corresponding to the color image signals on the photosensitive belt 201. A seam sensor 215 detects a seam of the loop-formed photosensitive belt 201. When the seam sensor 215 detects the seam, a timing controller 216 controls a light emitting timing of the LSU 206 so as to avoid the seam and angular displacements in formation of the electrostatic latent images of the colors become identical.

The developing units 207 to 210 accommodate toners corresponding to respective colors for development, and selectively come into contact with the photosensitive belt 201 at timings according to the electrostatic latent images on the photosensitive belt 201 corresponding to the color image signals. The electrostatic latent images are developed with the corresponding toners to obtain four-color images, and a full color image is formed by four-color superposed images.

The intermediate transfer unit 211 includes a drum-shaped transfer element 217 (hereinafter, "transfer drum 217") obtained by winding a belt-like sheet made of conductive resin around a metallic original pipe such as aluminum, and a cleaning unit 218 for the intermediate transfer element (hereinafter, "transfer-drum cleaning unit 218") obtained by forming rubber or the like to a blade shape. The transfer-drum cleaning unit 218 is separated from the transfer drum 217 during formation of the four-color superposed images on the transfer drum 217. Only when cleaning the transfer drum 217, the transfer-drum cleaning unit 218 comes in contact with the transfer drum 217, and scrapes off toner remaining on the transfer drum 217 after toner image is transferred to a recording paper 219 as the recording material. The recording paper 219 is sent out to a paper conveying path 222 one by one from a recording paper cassette 220 by a paper feed roller 221.

A transfer unit 223 transfers the full color image on the transfer drum 217 to the recording paper 219. The transfer unit 223 includes a transfer belt 224, a transfer device 225, and a separator 226. The transfer belt 224 is a belt made of conductive rubber. The transfer device 225 applies transfer bias to the transfer drum 217 so as to allow the full color image on the transfer drum 217 to be transferred to the recording paper 219. The separator 226 applies bias to the transfer drum 217 so that the recording paper 219 is prevented from being electrostatistically adhered to the transfer drum 217 after the full color image is transferred to the recording paper 219.

A fixing device 227 includes a heat roller 228 with a built-in heat source, and a press roller 229. By applying pressure and heat to the recording paper 219 during rotation thereof held by the heating roller 228 and the press roller 229, the full color image on the recording paper 219 is fixed thereto to form the fixed full color image.

The color copying in the configuration is operated as follows. The explanation is given assuming that the development of the electrostatic latent images is performed in order of black, cyan, magenta, and yellow.

The photosensitive belt 201 and the transfer drum 217 are driven in the directions of the arrow A and arrow B by respective drive sources (not shown). In this status, the charger 205 is applied with a high voltage of about −4 to 5 kilovolts from a power source (not shown), and constantly charges the surface of the photosensitive belt 201 to about −700 volts. Then, after a predetermined time is elapsed since the seam sensor 215 detects the seam of the photosensitive belt 201 so as to avoid the seam, the exposure light 214 as laser beam corresponding to a black image signal is radiated to the photosensitive belt 201 from the LSU 206. The charge on a portion of the photosensitive belt 201 radiated with the exposure light 214 is removed and an electrostatic latent image is formed thereon.

On the other hand, the developing unit 207 for black is brought into contact with the photosensitive belt 201 at a predetermined timing. Black toner contained in the developing unit 207 is negatively charged in advance, and therefore, the black toner is deposited only on the portion (portion of the electrostatic latent image). The development is carried out by a so-called negative-positive process. A black toner image formed on the surface of the photosensitive belt 201 by the developing unit 207 is transferred to the transfer drum 217. Residual toner that has not been transferred from the photosensitive belt 201 to the transfer drum 217 is removed by the photosensitive-belt cleaning unit 212, and the photosensitive belt 201 is decharged by the decharger 213.

Next, the charger 205 constantly charges the surface of the photosensitive belt 201 to about −700 volts. Then, after a predetermined time is elapsed since the seam sensor 215 detects the seam of the photosensitive belt 201 so as to avoid the seam, the exposure light 214 as laser beam corresponding to a cyan image signal is radiated to the photosensitive belt 201 from the LSU 206. The charge on a portion of the photosensitive belt 201 radiated with the exposure light 214 is removed and an electrostatic latent image is formed thereon.

On the other hand, the developing unit 208 for cyan is brought into contact with the photosensitive belt 201 at a predetermined timing. Cyan toner contained in the developing unit 208 is negatively charged in advance, and therefore, the cyan toner is deposited only on the portion (portion of the electrostatic latent image). The development is carried out by the so-called negative-positive process. A cyan toner image formed on the surface of the photosensitive belt 201 by the developing unit 208 is transferred superposedly to the black toner image on the transfer drum 217. Residual toner that has not been transferred from the photosensitive belt 201 to the transfer drum 217 is removed by the photosensitive-belt cleaning unit 212, and the photosensitive belt 201 is decharged by the decharger 213.

Next, the charger 205 constantly charges the surface of the photosensitive belt 201 to about −700 volts. Then, after a predetermined time is elapsed since the seam sensor 215 detects the seam of the photosensitive belt 201 so as to avoid the seam, the exposure light 214 as laser beam corresponding to a magenta image signal is radiated to the photosensitive belt 201 from the LSU 206. The charge on a portion of the photosensitive belt 201 radiated with the exposure light 214 is removed and an electrostatic latent image is formed thereon.

On the other hand, the developing unit 209 for magenta is brought into contact with the photosensitive belt 201 at a predetermined timing. Magenta toner contained in the developing unit 209 is negatively charged in advance, and therefore, the magenta toner is deposited only on the portion (portion of the electrostatic latent image). The development is carried out by the so-called negative-positive process. A magenta toner image formed on the surface of the photosensitive belt 201 by the developing unit 209 is transferred superposedly to the black toner image and the cyan toner image on the transfer drum 217. Residual toner that has not been transferred from the photosensitive belt 201 to the transfer drum 217 is removed by the photosensitive-belt cleaning unit 212, and the photosensitive belt 201 is decharged by the decharger 213.

Furthermore, the charger 205 constantly charges the surface of the photosensitive belt 201 to about −700 volts. Then, after a predetermined time is elapsed since the seam sensor 215 detects the seam of the photosensitive belt 201 so as to avoid the seam, the exposure light 214 as laser beam corresponding to a yellow image signal is radiated to the photosensitive belt 201 from the LSU 206. The charge on a portion of the photosensitive belt 201 radiated with the exposure light 214 is removed and an electrostatic latent image is formed thereon.

On the other hand, the developing unit 210 for yellow is brought into contact with the photosensitive belt 201 at a predetermined timing. Yellow toner contained in the developing unit 210 is negatively charged in advance, and therefore, the yellow toner is deposited only on the portion (portion of the electrostatic latent image). The development is carried out by the so-called negative-positive process. A yellow toner image formed on the surface of the photosensitive belt 201 by the developing unit 210 is transferred superposedly to the black toner image, the cyan toner image, and the magenta toner image on the transfer drum 217 to form a full color image on the transfer drum 217. Residual toner that has not been transferred from the photosensitive belt 201 to the transfer drum 217 is removed by the photosensitive-belt cleaning unit 212, and the photosensitive belt 201 is decharged by the decharger 213.

The full color image formed on the transfer drum 217 is collectively transferred to the recording paper 219 by the transfer device 225 of the transfer unit 223. More specifically, the transfer unit 223 having been away from the transfer drum 217 contacts the transfer drum 217, and the transfer device 225 is applied with a high voltage of about +1 kilovolt from the power source (not shown). The recording paper 219 is conveyed from the recording paper cassette 220 along the paper conveying path 222.

The voltage is applied to the separator 226 from the power source so that electrostatic force acts on the separator 226 so as to attract the recording paper 219, and thereby the recording paper 219 is separated from the transfer drum 217. Then, the recording paper 219 with the full color image is sent to the fixing device 227, the full color image is fixed thereon with the holding pressure by the heating roller 228 and the press roller 229 and the heat by the heating roller 228, and the recording paper 219 with the fixed full color image is discharged to a paper discharge tray 231 by paper discharge rollers 230.

The residual toner on the transfer drum 217, which has not been transferred to the recording paper 219 by the transfer unit 223, is removed by the transfer-drum cleaning unit 218. The transfer-drum cleaning unit 218 is positioned at an angular displacement such that it is separated from the transfer drum 217 until the full color image is obtained. After the full color image is transferred to the recording paper 219, the transfer-drum cleaning unit 218 comes in contact with the transfer drum 217 to remove the residual toner from the transfer drum 217. The formation of a piece of full color image is complete through a series of the operations.

In such a color copying machine, the rotational accuracy of the photosensitive belt 201 and the transfer drum 217 largely affect the quality of the final image. Therefore, it is particularly desirable that the photosensitive belt 201 and transfer drum 217 are driven highly accurately. In the color copying machine of the seventh embodiment, the drive roller, of the photosensitive-belt conveying rollers 202 to 204 among which the photosensitive belt 201 is wound around, is driven by the belt device as shown in any of FIG. 4, 6 or 8 in order to rotate the photosensitive belt 201 highly accurately. Likewise, in order to rotate the transfer drum 217 highly accurately, the transfer drum 217 is driven by the rotor driver as shown in FIG. 2. The rotor driver and the belt device are controlled by the drive control apparatus according to any of the first to fifth embodiments.

In the image forming apparatus of FIG. 12, a photosensitive belt device may be configured so as to include the photosensitive belt 201, the photosensitive-belt conveying rollers 202 to 204, an encoder (not shown) fixed to any of the photosensitive-belt conveying rollers 202 to 204 serving as a driven support rotor, a drive motor (not shown) fixed to any of the photosensitive-belt conveying rollers 202 to 204 serving as a drive support rotor, and the rotor driver. Further, the photosensitive belt device may also be configured as a process cartridge that is detachable with respect to the body of the image forming apparatus so as to facilitate its maintenance and replacement.

Figure 13:
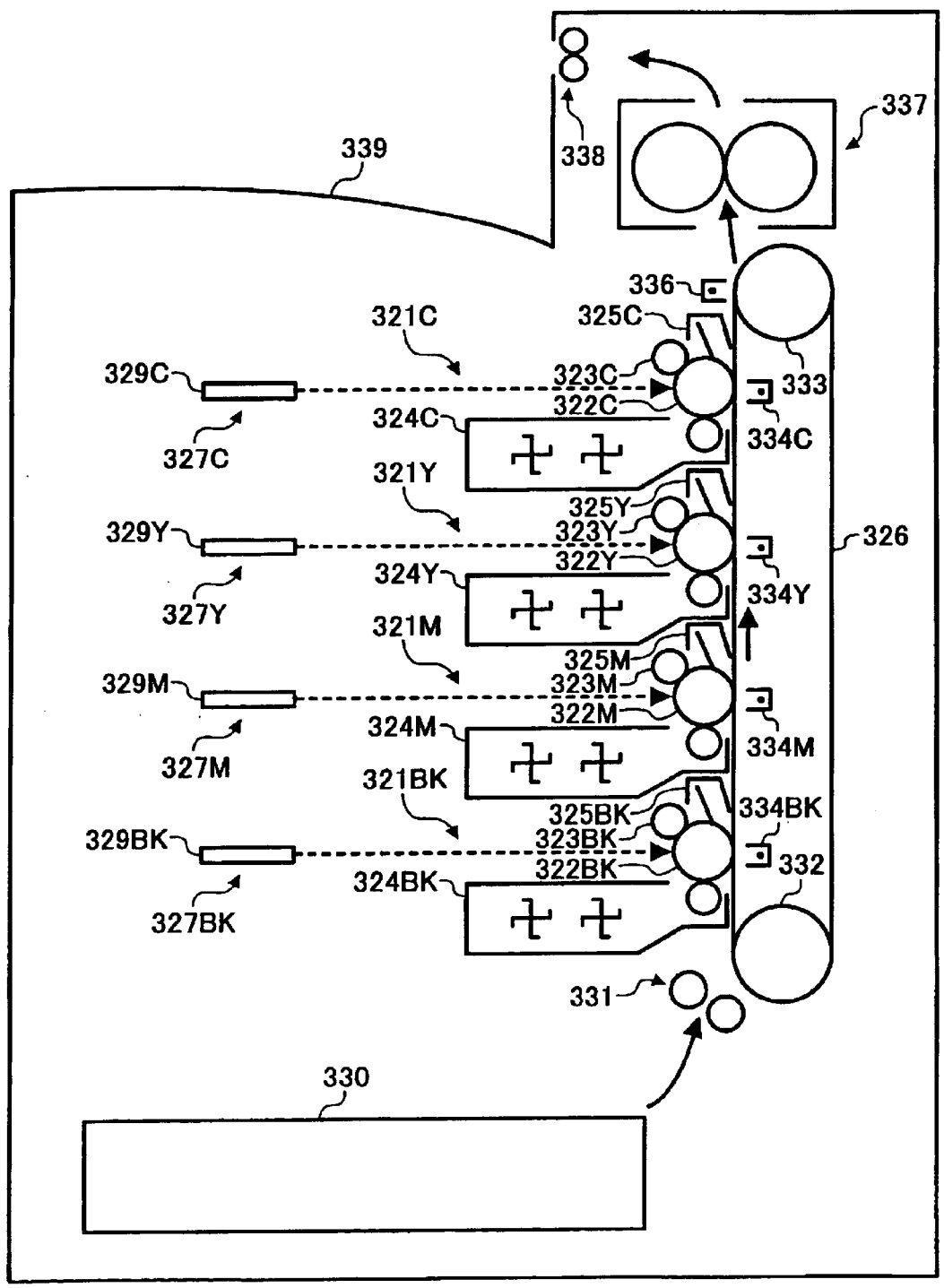
FIG. 13 is a schematic diagram of a color copying machine according to a eighth embodiment of the present invention.

FIG. 13 is a schematic diagram of a color copying machine as an image forming apparatus according to an eighth embodiment of the present invention. A plurality of image forming units 321Bk, 321M, 321Y, and 321C that respectively form color images of black (Bk), magenta (M), yellow (Y), and cyan (C) are arranged in the vertical direction. The image forming units 321Bk, 321M, 321Y, and 321C include drum-shaped photosensitive elements 322Bk, 322M, 322Y, and 322C (hereinafter, "photosensitive drums 322Bk, 322M, 322Y, and 322C") each as a latent image carrier, chargers (e.g., contact type chargers) 323Bk, 323M, 323Y, and 323C, developing devices 324Bk, 324M, 324Y, and 324C, and cleaning devices 325Bk, 325M, 325Y, and 325C, respectively.

The photosensitive drums 322Bk, 322M, 322Y, and 322C are arranged in the vertical direction with respect to an endless transfer-paper conveying belt 326 (hereinafter, "paper conveying belt 326"), and are rotated at the same circumferential velocity as that of the paper conveying belt 326. The photosensitive drums 322Bk, 322M, 322Y, and 322C are constantly charged by the chargers 323Bk, 323M, 323Y, and 323C, and are respectively exposed by exposing units 327Bk, 327M, 327Y, and 327C, each as an optical write device, and electrostatic latent images are formed.

In the optical write devices 327Bk, 327M, 327Y, and 327C, semiconductor laser drive circuits drive semiconductor lasers by Y, M, C, and Bk image signals to conduct deflection scanning on laser beams from the semiconductor lasers by polygon mirrors 329Bk, 329M, 329Y, and 329C. The laser beams from the polygon mirrors 329Bk, 329M, 329Y, and 329C form images on the photosensitive drums 322Bk, 322M, 322Y, and 322C through fθ lenses and mirrors to expose them, and electrostatic latent images are formed thereon.

The electrostatic latent images on the photosensitive drums 322Bk, 322M, 322Y, and 322C are respectively developed by the developing devices 324Bk, 324M, 324Y, and 324C to become Bk, M, Y, and C color toner images. Therefore, the chargers 323Bk, 323M, 323Y, and 323C, the optical write devices 327Bk, 327M, 327Y, and 327C, and the developing devices 324Bk, 324M, 324Y, and 324C respectively constitute imaging units that form Bk, M, Y, and C color images (toner images).

On the other hand, transfer paper such as an ordinary paper and an overhead projector (OHP) sheet is fed to a registration roller pair 331 along a transfer paper conveying path from a paper feed device 330 including a paper feed cassette that is provided in the lower part of the image forming apparatus. The registration roller pair 331 sends out the transfer paper to a nip part for transfer formed by the paper conveying belt 326 and the photosensitive drum 322Bk by being timed to the toner image on the photosensitive drum 322Bk in the first-color image forming unit (image forming unit that first transfers an image on the photosensitive drum to the transfer paper) 321 Bk.

The paper conveying belt 326 is wound around between a drive roller 332 and a driven roller 333, and the drive roller 332 is rotated by a driver (not shown) to allow the paper conveying belt 326 to rotate at the same circumferential velocity as that of the photosensitive drums 322Bk, 322M, 322Y, and 322C. The transfer paper sent out from the registration roller pair 331 is conveyed by the paper conveying belt 326. The Bk, M, Y, and C color toner images on the photosensitive drums 322Bk, 322M, 322Y, and 322C are sequentially transferred superposedly to the transfer paper by the action of an electric field produced by transfer units 334Bk, 334M, 334Y, and 334C each including a corona discharger to form a full color image. At the same time, the transfer paper with the full color image thereon is electrostatically adhered to the paper conveying belt 326 and is securely conveyed.

The transfer paper is decharged by a separator 336 as a separating charger and is separated from the paper conveying belt 326. Then, the full color image on the transfer paper is fixed by a fixing device 337 and the transfer paper is discharged to a paper discharge part 339 provided on the top surface of the image forming apparatus according to the eighth embodiment. The photosensitive drums 322Bk, 322M, 322Y, and 322C are cleaned by the cleaning devices 325Bk, 325M, 325Y, and 325C respectively after the toner images are transferred, and are in standby state for the next image forming operation.

In such a color copying machine, the rotational accuracy of the photosensitive drums 322Bk, 322M, 322Y, and 322C and the paper conveying belt 326 largely affects the quality of the final image. Therefore, it is desirable that the photosensitive drums 322Bk, 322M, 322Y, and 322C and the paper conveying belt 326 are driven further highly accurately. In the color copying machine of the eighth embodiment, in order to drive the photosensitive drums 322Bk, 322M, 322Y, and 322C highly accurately, they are driven by the rotor driver as shown in FIG. 2. Likewise, in order to rotate the paper conveying belt 326 highly accurately, the drive roller 332, around which the paper conveying belt 326 is wound, is driven by the belt device as shown in any of FIG. 4, FIG. 6, or FIG. 8. These rotor driver and the belt device are controlled by the drive control apparatus according to any of the first to fifth embodiments.

In the image forming apparatus of FIG. 13, a transfer-paper conveying belt device may include the paper conveying belt 326, the drive roller 332, the driven roller 333, and a rotor driver that drives the drive roller 332. Further, the transfer-paper conveying belt device may also be configured as a transfer-paper conveying belt unit that is detachable with respect to the body of the image forming apparatus so as to facilitate its maintenance and replacement.

Figure 14:
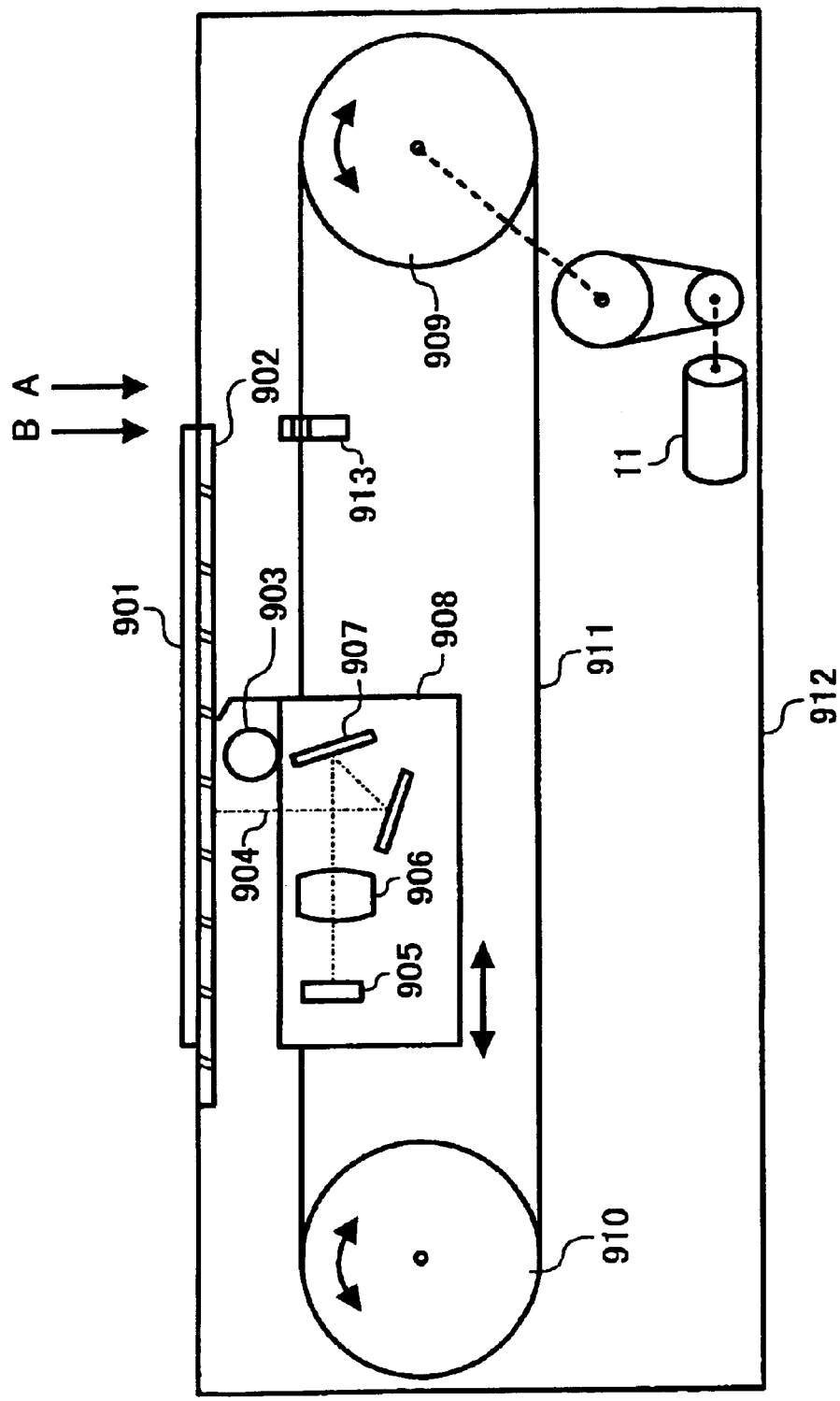
FIG. 14 is a schematic diagram of an image reading apparatus according to a ninth embodiment of the present invention.

FIG. 14 is a schematic diagram of an image reading apparatus according to a ninth embodiment of the present invention. The image reading apparatus includes a document glass 902 where a document 901 is placed, a document illumination system 903 that illuminates the document 901, and a photoelectric conversion unit 908 as a movable element for reading the document. The image reading apparatus further includes pulleys 909 and 910 for driving sub-scanning, a wire 911, a motor 11 as a drive source, and a housing 912. The photoelectric conversion unit 908 includes a charge coupled device (CCD) 905, an imaging lens 906, and a total reflecting mirror 907. A drive-force transmitting unit including the wire 911 and the pulleys 909 and 910 makes the photoelectric conversion unit 908 move in the sub-scanning direction of the document 901 by fixing the motor 11 to the housing 912. During the movement, the document illumination system 903 including a fluorescent lamp illuminates the document 901 on the document glass 902, reflects a flux of reflected light (optical axis is indicated by reference numeral 904) by a plurality of mirrors 907 to form an image of the document 901 on a light receiving part of the CCD 905 through the imaging lens 906. By scanning over the document 901 with the photoelectric conversion unit 908, the whole document is read. A sensor 913 that indicates an angular displacement at the start of reading is disposed below the end of the document 901. Further, the photoelectric conversion unit 908 is designed so that it is started and its velocity enters to a constant velocity stationary state within a period from a home position A to the angular displacement B at the start of reading. After the photoelectric conversion unit 908 reaches the point A, reading is started.

In such an image reading apparatus, the drive accuracy of the photoelectric conversion unit 908 as the movable element largely affects the quality of the read image. Therefore, it is desirable that the photoelectric conversion unit 908 is driven further highly accurately. In the image reading apparatus of the ninth embodiment, in order to drive the photoelectric conversion unit 908 highly accurately, one of the two pulleys 909 and 910, serving as a drive pulley, between which the wire 911 for driving the photoelectric conversion unit 908 is wound around, is driven by the rotor driver as shown in FIG. 2. The rotor driver is controlled by the drive control apparatus according to any of the first to fifth embodiments.

Figure 15:
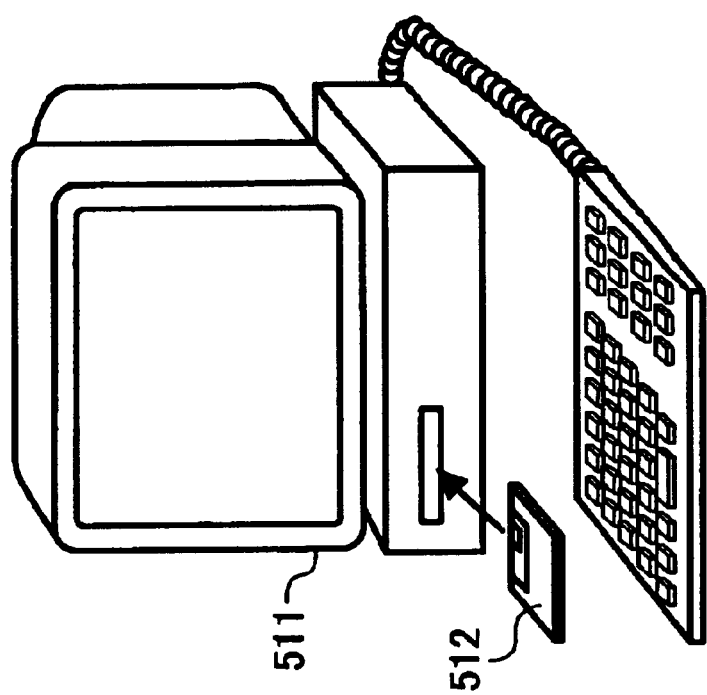
FIG. 15 is a front view of a personal computer that can be used to execute drive control in each of the embodiments.

The drive control in the embodiments can be executed using a computer. FIG. 15 is a front view of a personal computer 511 that can be used to execute drive control in each of the embodiments. A recording medium 512 detachably attached to the personal computer 511 stores computer programs to allow the personal computer 511 to execute arithmetic operation for control and data input and output. The personal computer 511 executes the computer programs to execute drive control in the embodiments. The recording medium 512 includes an optical disk such as a compact disk read only memory (CD-ROM) and a magnetic disk such as a flexible disk. The computer programs may be downloaded into the personal computer 511 through a communication network without using the recording medium.

As the computer used to execute the drive control according to the first to sixth embodiments, a microcomputer may be used. The microcomputer is used by being incorporated in the image forming apparatuses of FIG. 1 to FIG. 13 and the image reading apparatus of FIG. 14. In this case, as the recording medium storing the control program, ROM in the microcomputer may be used.

Specifically, the program includes the followings. For example, the first to fifth embodiments employ a control program that allows the computer to rotate the rotor 19 and the belt 30. The seventh embodiment employs a control program that allows the computer to control a photosensitive drum driver (rotor driver) that drives the photosensitive drum 112 of the image forming apparatus, and to control the belt device that drives the transfer belt 124. The seventh embodiment also employs another control program that allows the computer to control the belt device that drives the photosensitive belt 201 and the rotor driver that drives the transfer drum 217 of the image forming apparatus. The eighth embodiment employs a control program that allows the computer to control the rotor driver that drives the photosensitive drums 322Bk, 322M, 322Y, and 322C and the belt device that drives the paper conveying belt 326 of the image forming apparatus. The ninth embodiment employs a control program that allows the computer to control a movable element driver (rotor driver) that drives the photoelectric conversion unit 908 of the image reading apparatus.

According to the first to ninth embodiments, variable value control can be performed so that the angular displacement of the rotor and the displacement of the belt as a movable element approach the target values. Therefore, errors of the angular displacement of the rotor and the displacement of the belt are not cumulatively increased, unlike the case where control is performed so that the detected values of the angular velocity of the rotor and the velocity of the belt approach the target values. Therefore, it is possible to perform high-accuracy drive control on constant angular velocity of the rotor and perform high-accuracy drive control on constant velocity of the belt.

When the angular velocity of the rotor and the velocity of the belt in the conventional technology are detected and controlled, a method of using a time is generally used as the method of detecting the angular velocity or the like. This time is obtained by measuring the number of reference pulses at intervals of pulse signals output from the encoder or the marker sensor. In order to minimize a control error in the method of controlling so as to detect the angular velocity or the like and approach the target values, it is necessary to accurately detect the angular velocity. Therefore, an interval between the pulse signals output from the encoder or the like is required to be made longer, or a period of the reference pulse, as a reference of measuring the time used to calculate the angular velocity or the like, is required to be made shorter.

However, if the interval is made longer, then an interval of detecting the angular velocity for control, that is, an interval of drive control timings becomes longer, which results in increased control error. If the period is to be made shorter, then it is necessary to use an expensive device for generation and measurement of high frequency reference pulses, which results in increased cost. As explained above, increased control accuracy in the drive of the rotor at a constant angular velocity and in the drive of the belt at a constant velocity is traded off against reduced cost. Therefore, in the current control accuracy in the angular velocity of the rotor and the velocity of the belt, the limit is about 0.1% of the target angular velocity.

On the other hand, in the embodiments, the angular displacement of the rotor and the displacement of the belt are detected, and therefore, there is no need to use high-frequency reference pulses for increased detection accuracy, unlike the case where the angular velocity of the rotor and the velocity of the belt are detected. Therefore, the need for using a high-frequency pulse generator and a counter that result in increased cost is eliminated, which makes it possible to reduce the cost. Furthermore, as there is no need to make longer the period of detection timing (drive control timing) in order to enhance the detection accuracy, it is possible to minimize the control error of the angular displacement of the rotor and the displacement of the belt due to the longer period of the detection timing. Therefore, it is possible to perform high-accuracy drive control on constant angular velocity of the rotor and perform high-accuracy drive control on constant velocity of the belt with the accuracy of not more than 0.001% of the target values of the angular velocity and the velocity.

According to the fifth embodiment, a section that obtains a correction amount with respect to the reference drive pulse frequency is formed with the low-pass filter 8 and the proportional element 9. More specifically, the correction amount is obtained from a difference between a target angular displacement and a detected angular displacement or from a difference between a target displacement and a detected displacement in the controller 2. As explained above, by forming the section of obtaining the correction amount with the low-pass filter 8 and the proportional element 9, it is possible to avoid the control from being unstable because of high frequency noise, simplify the configuration of the drive control apparatus as compared with the case where the PI control system is used, and further to reduce the cost.

According to the sixth embodiment, the drive of the photosensitive drum 112 and the drive of the drive roller of the transfer belt 124 in the color copying machine are controlled by the drive control apparatus according to any of the first to fifth embodiments. Therefore, it is possible to enhance the accuracy in rotation of the photosensitive drum 112 and the transfer belt 124 at the constant angular velocity, and to form a high-quality color image without color misalignment or the like.

According to the seventh embodiment, the drive of the drive roller of the photosensitive belt 201 and the drive of the transfer drum 217 in the tandem type color copying machine are controlled by the drive control apparatus according to any of the first to fifth embodiments. Therefore, it is possible to enhance the accuracy in the drive of the photosensitive belt 201 at the constant velocity and in the rotation of the transfer drum 217 at the constant angular velocity, and to form a high-quality color image without color misalignment or the like.

According to the eighth embodiment, the drive of the photosensitive drums 322Bk, 322M, 322Y, and 322C and the drive of the drive roller 332 of the paper conveying belt 326 in the color copying machine are controlled by the drive control apparatus according to any of the first to fifth embodiments. Therefore, it is possible to enhance the accuracy in the drive of the photosensitive belt 201 at the constant velocity and in the drive of the transfer drum 217 at the constant angular velocity, and to form a high-quality color image without color misalignment or the like.

According to the ninth embodiment, the drive of the photoelectric conversion unit 908 as a movable element of the image reading apparatus is controlled by the drive control apparatus according to any of the first to fifth embodiments. Therefore, it is possible to enhance the accuracy in the drive of the photoelectric conversion unit 908, which moves along the surface of an image of a document, at the constant velocity, and to read the image highly accurately.

The drive control apparatus of the present invention can be used without any limitation to the drive of the rotor at the constant angular velocity and the drive of the movable element at the constant velocity in the image forming apparatus and the image reading apparatus. For example, the drive control apparatus of the present invention is applicable to drive control of the movable element and the rotor in an optical disk drive (ODD), a hard disk drive (HDD), or a robot.

Figure 16:
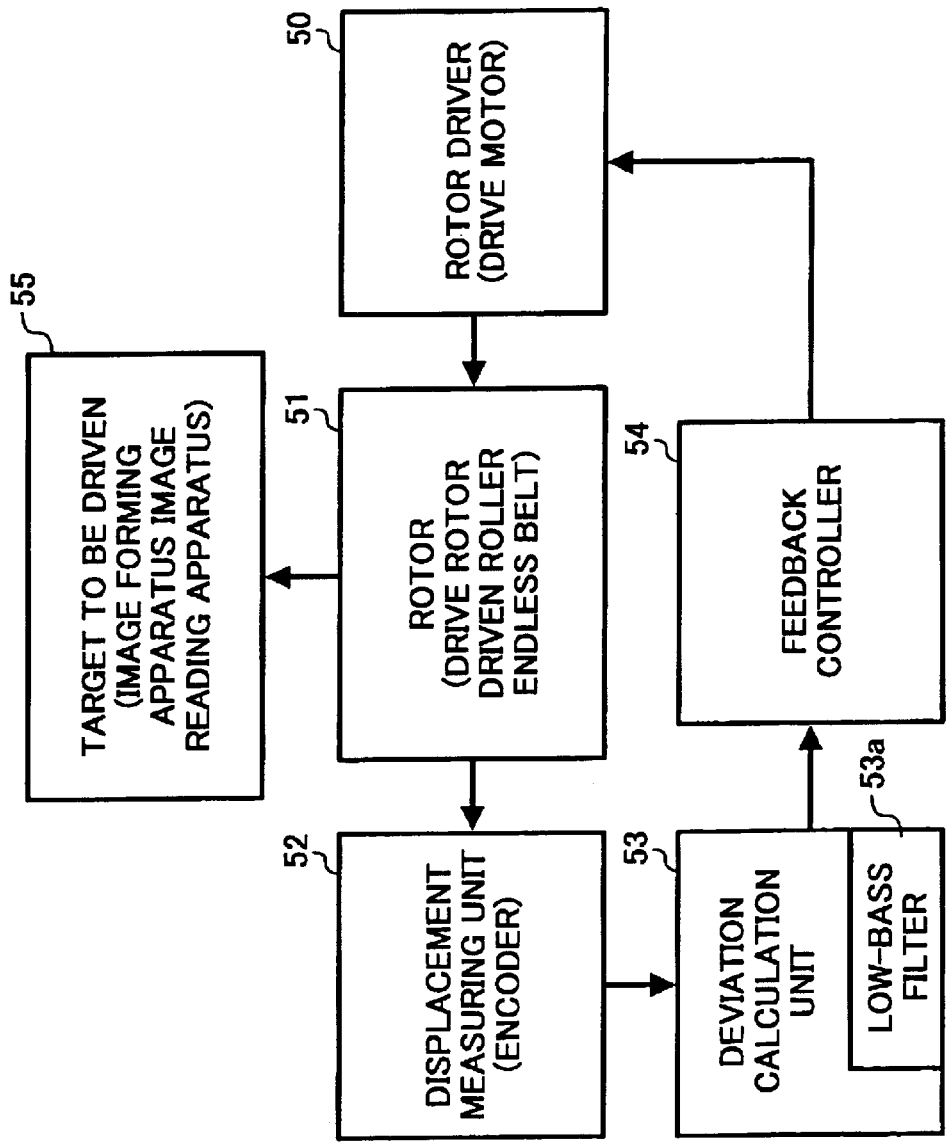
FIG. 16 is a block diagram of a schematic configuration of a drive control apparatus according to a tenth embodiment of the present invention.

FIG. 16 is a block diagram of a schematic configuration of a drive control apparatus according to a tenth embodiment of the present invention. The drive control apparatus includes a rotor driver 50, a rotor 51, a displacement measuring unit 52, a deviation calculating unit 13, and a feedback controller 54. The drive control apparatus rotates the rotor 51 to make the image forming apparatus and the image reading apparatus, as a target 55 to be driven, perform an image forming operation and an image reading operation.

As the feature of the drive control apparatus of the present invention, the rotor driver 50 such as a drive motor always rotates the rotor 51 as the drive roller, the driven roller, or the endless belt in one direction, and the rotor driver 50 is applied only when the drive is conducted so that an average velocity becomes constant.

The displacement measuring unit 52 such as an encoder measures a displacement of the rotor, the deviation calculating unit 53 obtains a deviation between the measured displacement and a target displacement, and the feedback controller 54 conducts feedback control on the rotor driver 50 based on the deviation.

Figure 17:
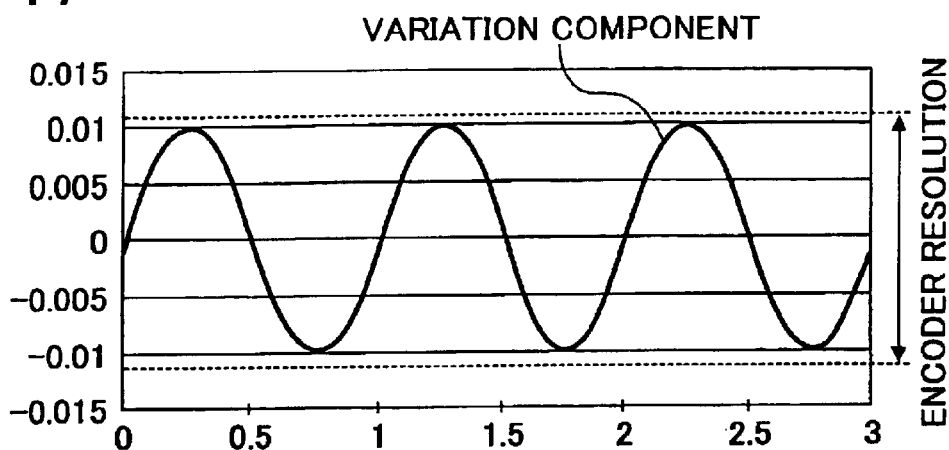
FIG. 17 is a diagram of a relation between an amplitude of a variable frequency and encoder resolution when the double amplitude of the frequency component is smaller than the encoder resolution.
Figure 18:
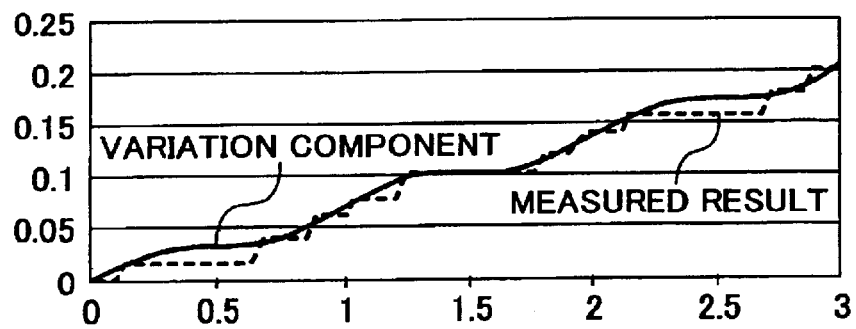
FIG. 18 is a diagram of a result of measuring the variation by the encoder having the same resolution as that of FIG. 17, by controlling the variation component in FIG. 17 so that an average angular velocity is constant without reverse rotation of the target to be controlled.
Figure 19:
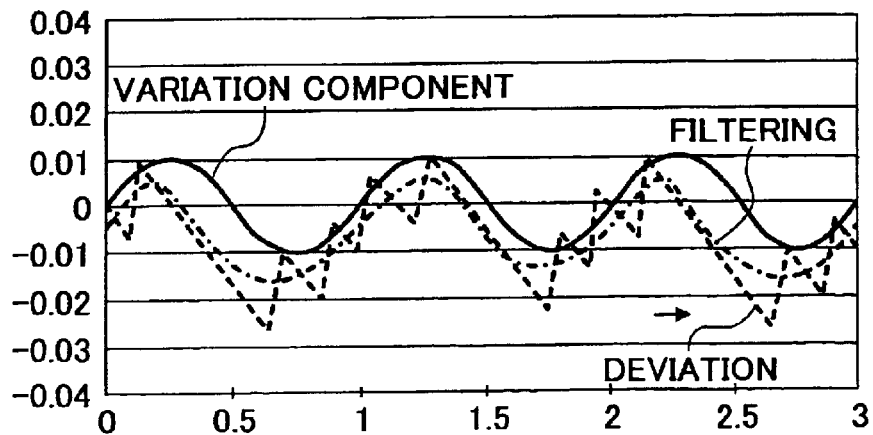
FIG. 19 is a diagram of the original variation component of FIG. 17 and a deviation obtained by subtracting an average angular velocity component from the result of measurement of FIG. 18.

The principle of the present invention is explained below with reference to FIG. 17 to FIG. 19. FIG. 17 is a diagram of a relation between an amplitude (displacement) of a variable frequency and encoder resolution when the double amplitude of the frequency component is smaller than the encoder resolution. FIG. 18 is a diagram of a result of measuring variations (displacement) by the encoder having the same resolution as that of FIG. 17, by controlling the variation component in FIG. 17 so that an average angular velocity is constant without reverse rotation of the target to be controlled. FIG. 19 is a diagram of the original variation component of FIG. 17 and a deviation obtained by subtracting the average angular velocity component from the result of measurement of FIG. 18. It is noted that the x-axis represents time and the y-axis represents displacement in FIG. 17 to FIG. 19.

As shown in FIG. 17, in a case where the double amplitude of the variation component is smaller than the encoder resolution, it has been considered impossible to control measurement by a conventional control system. Therefore, an expensive encoder with high resolution has to be used to deal with the case, and therefore, the device cost becomes inevitably high.

However, the inventors of the present application have found that the variation component (displacement), which was obviously impossible to be measured in FIG. 17, can be measured in such a manner as that of FIG. 18. More specifically, as shown in FIG. 18, the measurement becomes possible by measuring the variations using the encoder having the same resolution as that of the FIG. 17 when the variation component the same as that of FIG. 17 is controlled so that the target to be controlled is not reversely rotated (always rotated in one direction) and the average angular velocity is controlled to be constant.

As shown in FIG. 19, it is more clearly recognized as compared with FIG. 17 that the variation component, which has been thought impossible to be measured in FIG. 17, can be measured. More specifically, the measurement becomes possible by extracting a deviation (broken line in FIG. 19) obtained by subtracting an inclination component, i.e., an average angular velocity component from the result of measurement in FIG. 18 and displaying the deviation by overlapping the variation component (solid line in FIG. 19) shown in FIG. 17.

The drive control apparatus according to the present invention is restricted to such a case that the target to be controlled is not reversely rotated but is always rotated in one direction and the average angular velocity is controlled so as to be constant. This is because reverse rotation of the target affects the resolution of the encoder that measures a displacement of the target, which causes an measurement error to occur. Therefore, if the drive control apparatus is any device that controls the average angular velocity so as to be constant without reverse rotation of the target to be controlled, an error does not possibly occur even if an inexpensive encoder with low resolution is used. Thus, it is possible to highly accurately measure the variations with low cost, which makes it possible to control accurate rotation.

Furthermore, in the tenth embodiment, it is possible to use a low-pass filter 53a (FIG. 16) as required when rotation is controlled. If the low-pass filter 53a is used, a high frequency component other than a measured variation frequency, of the deviation shown in FIG. 19, can be removed. Therefore, it is possible to obtain a filter-processed waveform such that a waveform of the deviation is shaped to a smooth waveform.

One example of the configuration of an angular displacement feedback controller using a pulse motor is the same as that of FIG. 2. A block diagram of hardware of a control system that performs digital control based on the angular displacement of the pulse motor is the same as that of FIG. 3. A block diagram of software of a control system including a deviation calculating unit that obtains a deviation between a displacement of the rotor and a target displacement is the same as that of FIG. 1. Therefore, overlapping explanation is omitted herein.

In the angular displacement feedback controller as shown in FIG. 3, the encoder 18 is an encoder as a displacement measuring unit that detects an angular displacement of the rotor 19. The encoder 18 is fixed to the shaft 20 of the rotor 19 though a coupling (not shown). As the resolution of the encoder 18 used here, resolution that is roughly set can be employed. Specifically, the resolution is rougher than the double amplitude of the main variation component of the target to be measured and controlled. Therefore, even if an inexpensive encoder is used, satisfactory measurement accuracy can be obtained, thus performing the drive control highly accurately.

As explained above, the microcomputer 21 digitally controls angular displacement of the pulse motor 11 as shown in FIG. 3 based on a status detection signal of the rotor 19 (output signal of the encoder 18 herein). The instruction generator 23 issues a status instruction signal to instruct a target angular displacement of the rotor 19 and generates an angular displacement instruction signal, and an output side thereof is connected to the bus 22.

The detection interface 261 processes pulses output from the encoder 18 and converts the processed pulses to digital numerals, and has a counter that counts the pulses. The detection interface 261 multiplies the counted value of the counter by a conversion constant for a preset diagonal displacement of the number of pulses to convert a multiplied value to an angular displacement of the rotor 19.

As shown in FIG. 3, the motor-driving interface 24 converts the result (control output) of calculation in the microcomputer 21 to a pulsed signal (control signal) that operates a power semiconductor forming the motor driver 25. This motor driver 25 operates based on the pulsed signal output from the motor-driving interface 24, and rotates the pulse motor 11. As a result, variable value control is performed on a predetermined angular displacement of the rotor 19 instructed by the instruction generator 23. As explained above, the angular displacement of the rotor 19 is taken into the encoder 18, the detection interface 261, and the microcomputer 21, and the operations are repeated.

As shown in FIG. 1, information P(i−1) for an angular displacement of the target 29 to be controlled is output of the detection interface 261 that processes the output of the encoder 18, that is, the angular displacement of the rotor 19, and the output is input to the arithmetic unit 1. The arithmetic unit 1 calculates a difference e(i) between a target angular displacement Ref(i) of the rotor 19 as a target control value and the angular displacement P(i−1) of the rotor 19. The difference e(i) is input to the controller 2.

The controller 2 includes, for example, the PI control system. The difference e(i) calculated in the arithmetic unit 1 is integrated in the integral element 3, and is multiplied by the constant KI in the proportional element 4, and a multiplied value as a signal is input to the arithmetic unit 5. At the same time, the difference e(i) calculated in the arithmetic unit 1 is multiplied by the constant Kp in the proportional element 6, and a multiplied value as a signal is input to the arithmetic unit 5. The arithmetic unit 5 adds the two input signals from the proportional elements 4 and 6, and inputs the result of addition to the arithmetic unit 7. Then, the arithmetic unit 7 adds a constant pulse input (reference drive pulse frequency) Refp_c to the result to determine a drive pulse frequency u(i).

The drive pulse frequency u(i) obtained in the arithmetic unit 7 in the above manner is output to the pulse motor 11 through the motor-driving interface 24 and the motor driver 25 as shown in FIG. 3 to rotate the rotor 19 through the transmission system. Such loop operations are repeated.

In the controller 2 of FIG. 1, explanation is given using the PI control system as one example, but the controller is not limited to this. All the calculations are performed through the numerical operation provided in the microcomputer 21, and therefore, the calculations are easily performed. Further, the constant pulse input Refp_c is the number of pulses that are uniquely determined based on the angular velocity of the rotor and a deceleration ratio of a deceleration system. However, in the tenth embodiment, the number of pulses can be arbitrarily selected in a range in which loss of synchronism does not occur during driving of the motor. The target angular displacement Ref(i) of the rotor 19 as a target control value can be easily obtained by integrating the target constant angular velocities of the rotor 19. A range in which a target average angular velocity is applied is defined as a range in which an average angular velocity is controlled so as to be constant without reverse rotation of the target to be controlled.

As explained above, according to the tenth embodiment, the resolution of the encoder can be set low while measurement accuracy is maintained, and therefore, it is possible to construct an angular displacement feedback controller at lower cost.

In the tenth embodiment, a stepping motor is used as the drive motor, but the motor is not limited to this, a DC motor or an AC motor may be used. Further, as a control arithmetic operation executed by the controller 2, proportional (P) control, proportional-integral-derivative (PID) control, or H∞ control can be used.

An eleventh embodiment of the present invention is explained below. The configuration of a drive unit in this embodiment is the same as that of FIG. 4. The drive control apparatus as shown in FIG. 4 includes the pulse motor 11 as the rotor driver to rotate the belt 30. Rotational torque of the pulse motor 11 is transmitted to the drive shaft 39 of the belt 30 and the drive roller 31 by the timing belt 37 as the deceleration system that forms the power transmission system. The belt 30 is wound around among the drive roller 31 and the driven rollers 32, 33, 34, 35, and 36, so that the belt 30 moves as the drive roller 31 is rotated by the pulse motor 11.

The encoder 18 is a status detector that detects an angular displacement of the drive roller 31, and is fixed to the drive shaft 39 of the drive roller 31 through a coupling (not shown). The resolution of the encoder 18 used here is set rougher than the double amplitude of the main variation component of the target to be measured and controlled in the same manner as the tenth embodiment.

The control system of the drive control apparatus using the endless belt as shown in FIG. 4 is substantially the same as that of FIG. 1 and FIG. 3, and hence overlapping explanation is omitted. Furthermore, in the eleventh embodiment, a range in which a target average velocity is applied is defined as a range in which an average velocity is controlled so as to be constant without reverse rotation of the belt 30 as a target to be controlled.

As explained above, according to the eleventh embodiment, the resolution of the encoder can be set low while measurement accuracy is maintained, and therefore, it is possible to construct the drive control apparatus of the endless belt at lower cost.

A twelfth embodiment of the present invention is explained below. The configuration of the drive control apparatus is the same as that of FIG. 6, which is explained above. Therefore, the overlapping explanation of the basic configuration is omitted. It is noted that the encoder 18 is a status detector that detects an angular displacement of the driven roller 32, and is fixed to the shaft 40 of the driven roller 32 through the coupling (not shown). The resolution of the encoder 18 used here is set rougher than the double amplitude of the main variation component of the target to be measured and controlled in the same manner as the eleventh embodiment.

The control system of the drive control apparatus using the endless belt as shown in FIG. 6 is substantially the same as that of FIG. 1 and FIG. 3, and hence overlapping explanation is omitted. Furthermore, in the twelfth embodiment, a range in which a target average velocity is applied is defined as a range in which an average velocity is controlled so as to be constant without reverse rotation of the belt 30 as a target to be controlled.

As explained above, according to the twelfth embodiment, the resolution of the encoder can be set low while measurement accuracy is maintained, and therefore, it is possible to construct the drive control apparatus of the endless belt at lower cost.

A thirteenth embodiment of the present invention is explained below. The configuration of the drive control apparatus is the same as that of FIG. 8, which is explained above. Therefore, the overlapping explanation of the basic configuration is omitted. As explained above, the marker 41 is formed like a belt at one edge of the belt 30 along its circumference, and the marker sensor 42 is disposed at a position that faces the marker 41. The marker sensor 42 includes a photo interrupter, and outputs a digital signal of "1" when the marker 41 arrives at a detection position and faces the marker sensor 42. The marker sensor 42 outputs a digital signal of "0" when a space between the markers 41 arrives at the detection position and faces the marker sensor 42. By counting the digital signals output from the marker sensor 42, the displacement of the surface of the belt 30 can be detected. The resolution of the marker sensor 42, i.e., a linear encoder used here is set rougher than the double amplitude of the main variation component of the target to be measured and controlled in the same manner as that of the first to third embodiments.

The control system of the drive control apparatus using the endless belt as shown in FIG. 8 is substantially the same as that of FIG. 1 and FIG. 3, and hence overlapping explanation is omitted. Furthermore, in the thirteenth embodiment, a range in which a target average velocity is applied is defined as a range in which an average velocity is controlled so as to be constant without reverse rotation of the belt 30 as a target to be controlled.

As explained above, according to the thirteenth embodiment, the resolution of the marker sensor, i.e., the linear encoder can be set low while measurement accuracy is maintained, and therefore, it is possible to construct the drive control apparatus of the endless belt at lower cost.

Figure 20:
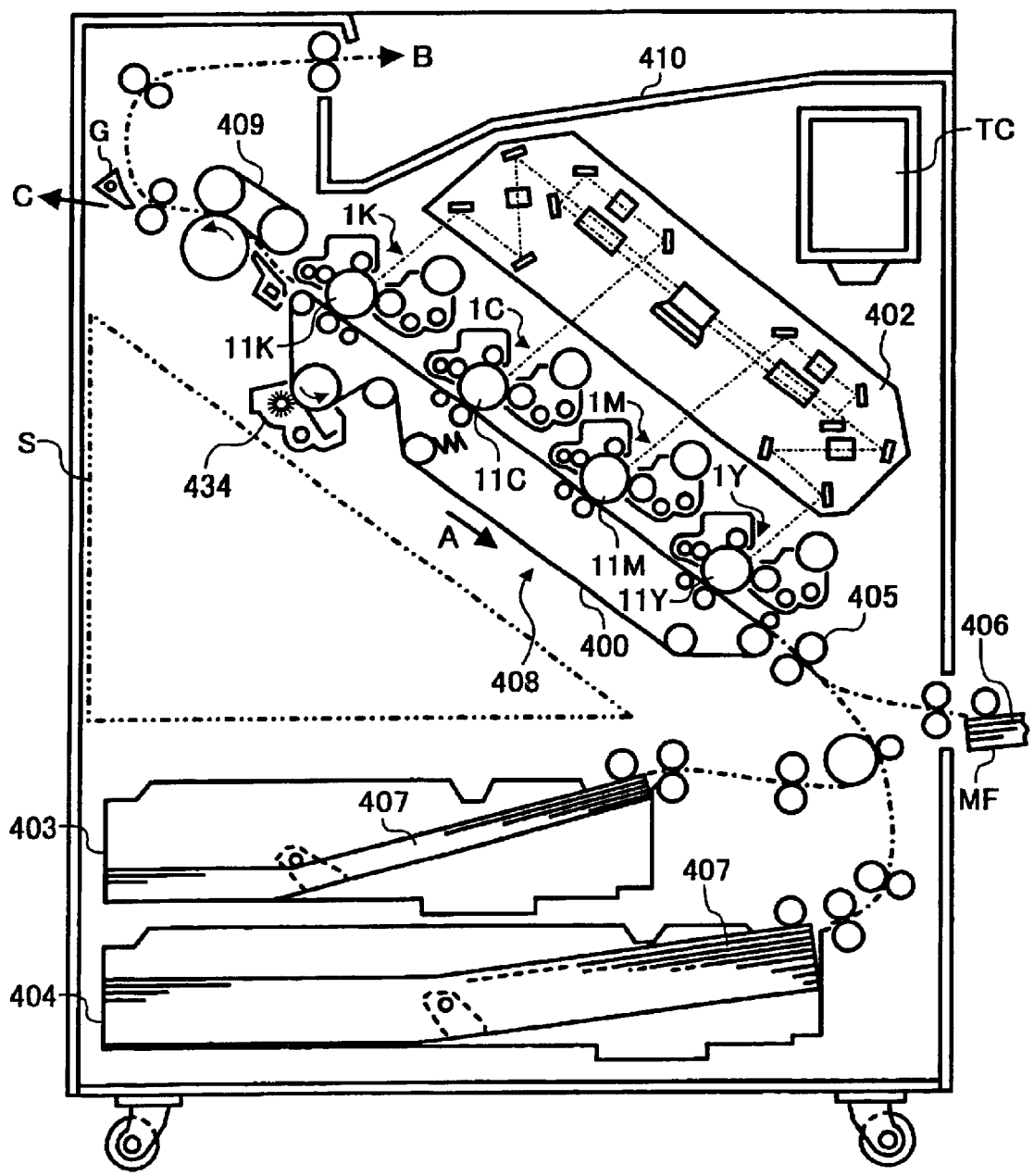
FIG. 20 is a schematic diagram of a color laser printer of a direct transfer system in an electrophotographic method, as an image forming apparatus according to a fourteenth embodiment of present invention.
Figure 21:
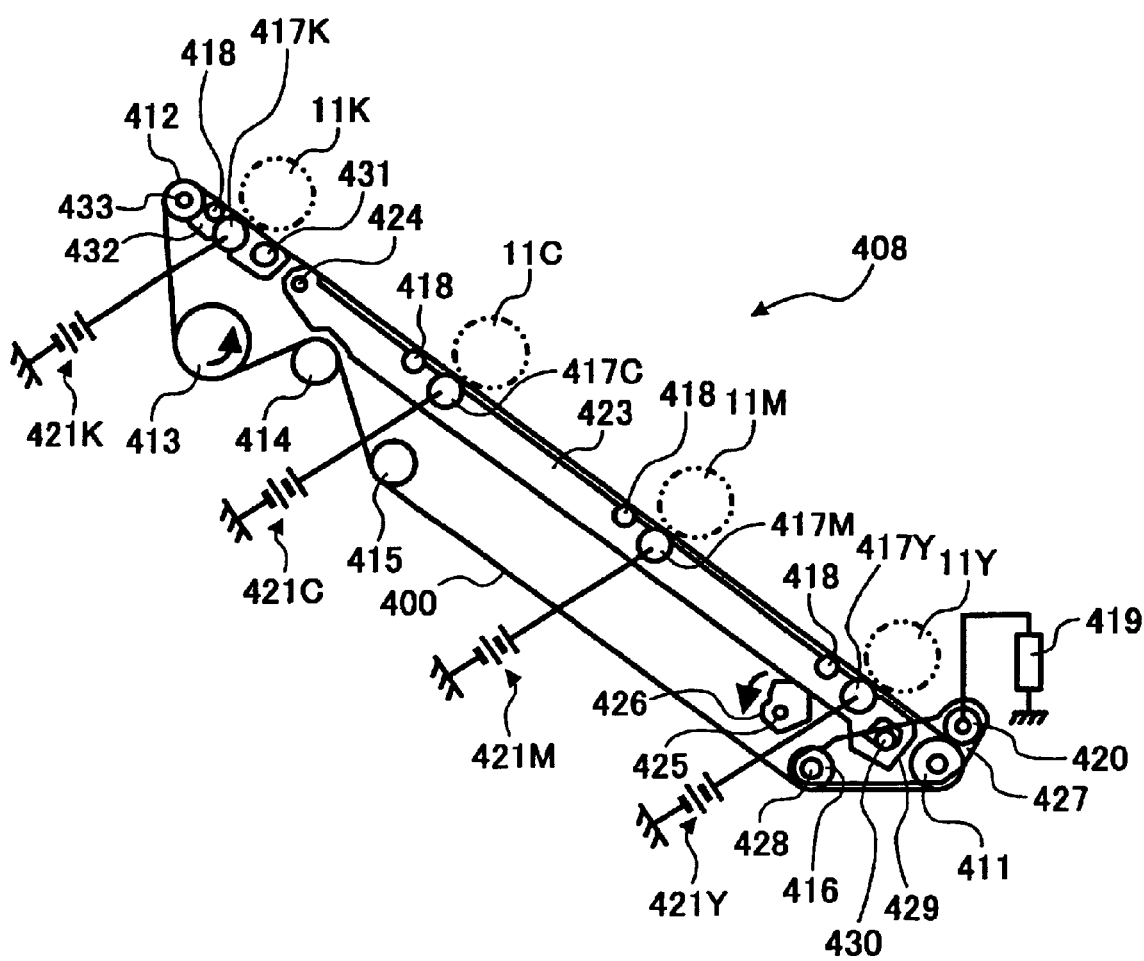
FIG. 21 is a schematic diagram of a transfer unit of FIG. 20.

A fourteenth embodiment of the present invention is explained below. FIG. 20 is a schematic diagram of a color laser printer of a direct transfer system in an electrophotographic method, as an image forming apparatus of the fourteenth embodiment. FIG. 21 is a schematic diagram of a transfer unit part of FIG. 20.

A color laser printer of FIG. 20 includes four toner image forming units 1Y, 1M, 1C, and 1K that form images of yellow (Y), magenta (M), cyan (C), and black (K) colors provided in order from the upstream side in a direction of the movement of transfer paper 406 and 407 (direction of the movement of a transfer paper conveying belt 400 indicated by an arrow A in FIG. 20). The toner image forming units 1Y, 1M, 1C, and 1K respectively includes photosensitive drums 11Y, 11M, 11C, and 11K as image carriers, and a developing unit. The toner image forming units 1Y, 1M, 1C, and 1K are arranged so as to be parallel with each rotational axis of the photosensitive drums and are arranged at a predetermined pitch from each other in the direction of the movement of the transfer paper.

The laser printer includes, in addition to the toner image forming units 1Y, 1M, 1C, and 1K, an optical write unit 402, paper feed cassettes 403 and 404, and a registration roller pair 405. The laser printer also includes a transfer unit 408 as a belt (rotor) driver having the paper conveying belt 400 that carries and conveys a transfer paper 407 through each transfer position of the respective toner image forming units, a fixing unit 409 of a belt fixing method, and a paper discharge tray 10. The laser printer further includes a manual feed tray MF and a toner container TC. A waste toner bottle, a reversing unit for double-sided printing, and a power supply unit, which are not shown, are included in a triangular space S indicated by a two-dot chain line. The optical write unit 402 has a light source, a polygon mirror, a fθ lens, and a reflection mirror, and radiates each surface of the photosensitive drums 11Y, 11 M, 11C, and 11K with laser light while scanning based on image data.

As shown in FIG. 21, the paper conveying belt 400 used in the transfer unit 408 is an endless single layer belt with high resistance whose volume resistivity is 109 to 1011 ohm-centimeters. The material of the belt is polyvinylidene fluoride (PVDF). This paper conveying belt 400 is wound around among support rollers 411 to 418 so as to pass through each transfer position that contacts each of the photosensitive drums 11Y, 11M, 11C, and 11K. An electrostatic attracting roller 420 is disposed at a position that faces the roller 411 as an entrance roller among the support rollers. More specifically, the entrance roller 411 is disposed on the upstream side of the direction of the transfer paper movement, and the electrostatic attracting roller 420 is applied with a predetermined voltage from a power supply 419 and is disposed on the side of the outer circumferential surface of the paper conveying belt 400. The transfer paper 407 having passed through the two rollers 411 and 420 is electrostatically attracted to the paper conveying belt 400. The roller 413 is a drive roller that frictionally drives the paper conveying belt 400, and is connected to a drive source (not shown) to rotate in the direction indicated by an arrow. As a transfer electric field forming unit that forms a transfer electric field at each of the transfer positions, transfer-bias applying members 417Y, 417M, 417C, and 417K are disposed at positions that face photosensitive drums, respectively, so as to be in contact with the backside of the paper conveying belt 400. These members are bias rollers with sponge provided around the outer circumference thereof, and each core metal of the rollers is applied with transfer bias from the transfer-bias power supplies 421Y, 421M, 421C, and 421K. The paper conveying belt 400 is charged for transfer by the action of the applied transfer bias, and thereby a transfer electric field with a predetermined intensity is produced at each of the transfer positions between the paper conveying belt 400 and each surface of the photosensitive drums.

A backup roller 418 is provided in order to maintain an appropriate contact between the transfer paper and the photosensitive drum at an area where the transfer is carried out to obtain a best transfer nip. The transfer-bias applying members 417Y, 417M, and 417C and the backup rollers 418 each disposed in the vicinity of the respective transfer-bias applying members 417Y, 417M, and 417C are integrally held by a swinging bracket 423, and therefore they pivot around a pivot 424. They pivot in the clockwise when a cam 426 fixed to a cam shaft 425 rotates in the direction of the arrow. The entrance roller 411 and the attracting roller 420 are integrally supported by an entrance roller bracket 427 and can pivot in the clockwise around an axis 428. A pin 430 provided in the entrance roller bracket 427 is engaged in a hole 429 on the swinging bracket 423, so that the entrance roller bracket 427 pivots together with the pivotal movement of the swinging bracket 423. With the pivotal movement of the entrance roller bracket 427 and swinging bracket 423 in the clockwise, the transfer-bias applying members 417Y, 417M, and 417C and the backup rollers 418 are separated from the photosensitive drums 11Y, 11M, and 11C, and the entrance roller 411 and the attracting roller 420 are also moved downward. When only a black image is formed, it is possible to avoid the contact between the photosensitive drums 11Y, 11M, and 11C and the paper conveying belt 400.

On the other hand, the transfer-bias applying member 417K and the adjacent backup roller 418 are pivotably supported by an exit bracket 432, and are pivotable around an axis 433 of a coaxial exit roller 412. When the transfer unit 408 is attached or detached to or from the body, the exit bracket 432 are pivoted in the clockwise by the operation with a handle (not shown) so that the transfer-bias applying member 417K and the backup roller 418 are separated from the photosensitive drum 11K for black image formation. A cleaning device 434 including a brush roller and a cleaning blade is provided so that it is in contact with the outer circumferential surface of the paper conveying belt 400 wound around the drive roller 413. Foreign matters such as toner deposited on the paper conveying belt 400 is removed by the cleaning device 434. A roller 414 is provided on the downstream side of the drive roller 413 in the direction of the movement of the paper conveying belt 400 in such a manner that the roller 414 presses inwardly the outer circumferential surface of the paper conveying belt 400, and thereby a wind angle of the paper conveying belt 400 with respect to the drive roller 413 can remain constant. A tension roller 415 is provided on the further downstream side of the roller 414 inside a loop of the paper conveying belt 400. The tension roller 415 applies tension to the paper conveying belt 400 by a pressing member (spring) (not shown).

Referring back to FIG. 20, a dashed line indicates a conveying path of the transfer papers 406 and 407. The transfer paper 406 or 407 supplied from the paper feed cassettes 403 and 404 or from the manual feed tray MF is conveyed, while being guided by a conveying guide (not shown), to a stop position where the registration roller pair 405 is provided. The transfer paper 406 or 407 sent out at a predetermined timing by the registration roller pair 405 is carried on the paper conveying belt 400 and conveyed toward the toner image forming units 1Y, 1M, 1C, and 1K, and passes through each of the transfer nips. Developed toner images on the photosensitive drums 11Y, 11M, 11C, and 11K are sequentially transferred superposedly to the transfer paper 406 or 407 at the respective transfer nips by the action of the transfer electric field and a nip pressure. With the transfer in a superposition manner, a full color toner image is formed on the transfer paper 406 or 407. The surfaces of the photosensitive drums 11Y, 11M, 11C, and 11K after the toner images are transferred, are cleaned by respective cleaning devices, and are decharged to be in standby state for the next formation of electrostatic latent images.

On the other hand, the transfer paper 406 or 407 with the full color toner image is conveyed to the fixing unit 409, and the full color toner image is fixed therein, and the transfer paper 406 or 407 with the fixed full color toner image is conveyed toward a first paper discharge direction B or a second paper discharge direction C corresponding to a direction directed by a switching guide G. When discharged from the first paper discharge direction B to a paper discharge tray 410, the transfer paper 406 or 407 is stacked with the surface of the image is down, so-called face down. On the other hand, when discharged in the second paper discharge direction C, the transfer paper 406 or 407 is conveyed toward another post-processor (sorter, binding device, etc.) (not shown), or to the registration roller pair 405 again for double-sided printing through a switch-back section. In such an image forming apparatus, an encoder to detect movement of the belt surface is provided to the drive roller 413 for the paper conveying belt 400 or a driven roller of a transfer unit 416 to perform drive control on the paper conveying belt 400.

The resolution of the encoder of the fourteenth embodiment is set rougher than the double amplitude of the main variation component of the target to be measured and controlled like in the tenth to thirteenth embodiments.

The control system of the laser printer as shown in FIG. 20 and FIG. 21 is substantially the same as that of FIG. 1 and FIG. 3, and hence overlapping explanation is omitted. Furthermore, in the fourteenth embodiment, a range in which a target average velocity is applied is defined as a range in which an average velocity is controlled so as to be constant without reverse rotation of the paper conveying belt 400 as a target to be controlled.

As explained above, according to the fourteenth embodiment, even if an encoder with low resolution is used to construct the control system, satisfactory control can be performed on the transfer paper conveying belt, and therefore, it is possible to obtain a high-quality image at low cost with less color misalignment and banding.

In the fourteenth embodiment, the present invention is applied as the transfer unit 408 in a tandem type printer in which the photosensitive drums 11Y, 11M, 11C, and 11K are arranged on the paper conveying belt 400, but the printer and the belt driver to which the present invention is applicable are not limited to these. For example, if any belt driver rotates an endless belt stretched by a plurality of rollers by at least one of these rollers and any printer has the belt driver, the present invention can be applied to both of these.

A fifteenth embodiment of the present invention is explained below. An image forming apparatus (color copying machine) of this embodiment employs a revolver type of imaging configuration different from the configuration of FIG. 20, and has the same configuration as that of FIG. 11. Therefore, overlapping explanation is omitted.

The color copying machine forms a color image by sequentially superposing four colors on one another. If three-color superposed images are to be formed, three different single-color images are sequentially formed on the photosensitive drum 112 as an image carrier, and are transferred superposedly to the transfer belt 124 one by one. The superposed images are collectively transferred to the recording material. If two-color superposed images are to be formed, two different single-color images are sequentially formed on the photosensitive drum 112, and are transferred superposedly to the transfer belt 124 one by one. The superposed images are collectively transferred to the recording material. Furthermore, if a single-color image is to be formed, one single-color image is formed on the photosensitive drum 112, transferred to the transfer belt 124, and then the transferred image is further transferred to the recording material. In such a color copying machine, the rotational accuracy of the image carrier largely affects the quality of the final image. Therefore, it is desirable that the image carrier is driven further highly accurately.

In the fifteenth embodiment, the drive of the photosensitive drum 112 is controlled by the drive control apparatus of the tenth embodiment, and the drive of the transfer belt 124 is controlled by any one of the belt drivers according to the eleventh embodiment to the fourteenth embodiment.

As explained above, according to the fifteenth embodiment, drive control of the image carrier such as the photosensitive drum and the intermediate transfer belt is performed in the same manner as the drive control apparatus according to any one of the first to fifth embodiments. Therefore, an inexpensive encoder with low resolution is used to construct the control system of the image carrier, which allows satisfactory control for the image carrier. Thus, it is possible to obtain a high-quality image at low cost with less color misalignment and banding.

A sixteenth embodiment of the present invention is explained below. The configuration of an image forming apparatus (color copying machine) of this embodiment is the same as that of FIG. 12. Therefore, overlapping explanation is omitted.

In such a color copying machine, the rotational accuracy of the photosensitive belt 201 as an image carrier and the transfer drum 217 largely affects the quality of the final image. Therefore, it is desirable that the photosensitive belt 201 and the transfer drum 217 are driven further highly accurately.

In the sixteenth embodiment, the drive of the photosensitive belt 201 is controlled by the drive control apparatus according to any one of the eleventh to thirteenth embodiments, and the drive of the transfer drum 217 is controlled by the rotor driver according to the tenth embodiment.

As explained above, according to this embodiment, the drive control of the photosensitive belt 201 as the image carrier and the transfer drum 217 is performed by the drive control apparatus according to any one of the tenth to thirteenth embodiments. Therefore, an inexpensive encoder with low resolution is used to construct the control system of the image carrier, which allows satisfactory control for the image carrier. Thus, it is possible to obtain a high-quality image at low cost with less color misalignment and banding.

Figure 22:
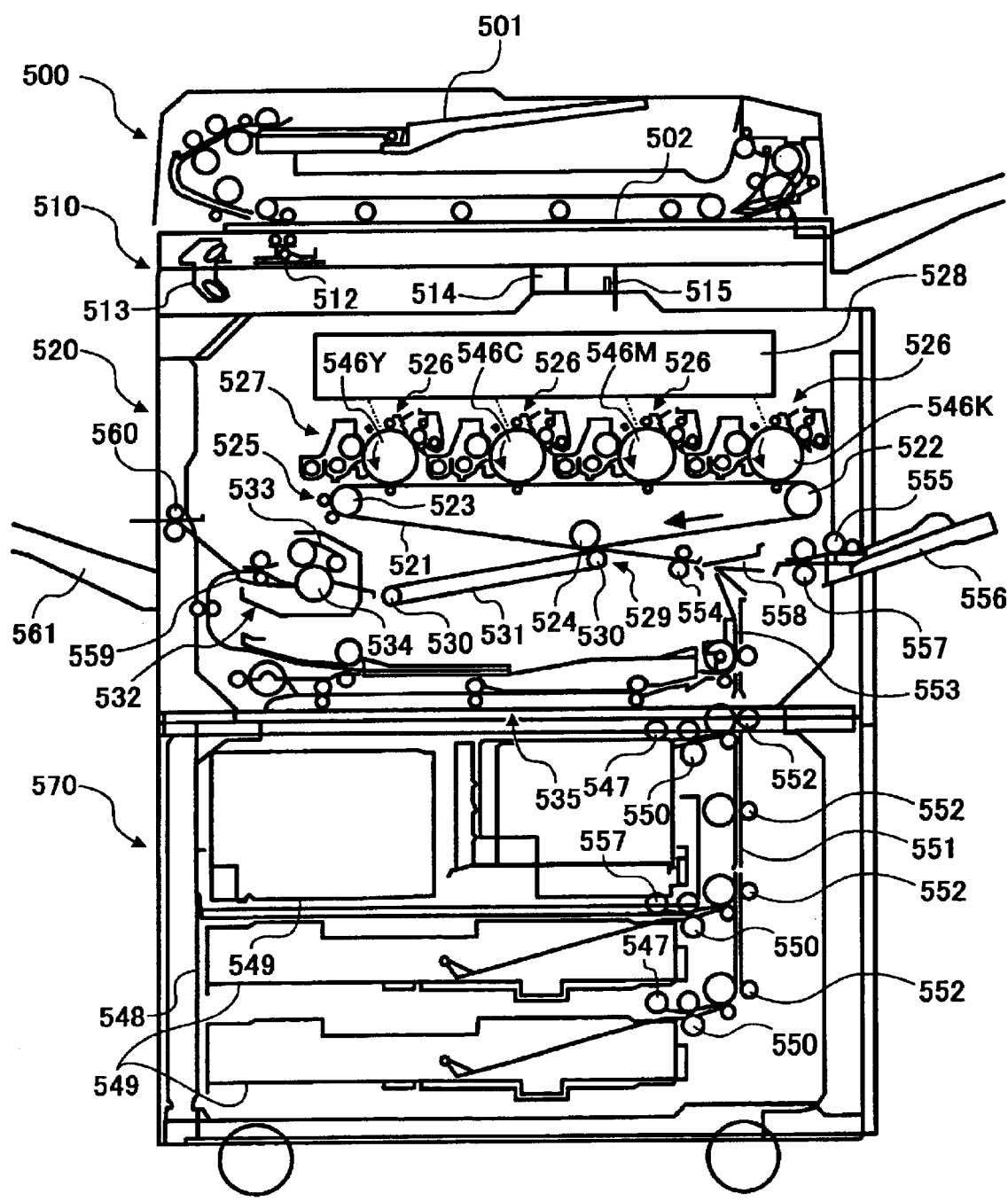
FIG. 22 is a schematic diagram of a color laser printer of an indirect transfer system in an electrophotographic method, as an image forming apparatus according to a seventeenth embodiment of present invention.

A seventeenth embodiment of the present invention is explained below. FIG. 22 is a schematic diagram of a color copying machine of a tandem type indirect transfer system in the electrophotographic method, as an image forming apparatus according to the seventeenth embodiment. The color copying machine is largely divided into a body 520 of the color copying machine, a paper feed table 570 on which the body 520 is placed, a scanner 510 fixed on the body 520, and an automatic document feeder (ADF) 500 fixed on the scanner 510.

The body 520 of the color copying machine includes photosensitive drums 546Y, 546C, 546M, and 546K. The body 520 also includes an endless belt-like intermediate transfer element 521 provided at the central part thereof. The intermediate transfer belt 521 has a base layer formed with, for example, fluororesin with less dilation or a material obtained by combining a material such as canvas that is less flexible with a rubber material with much flexible, and an elastic layer provided on the base layer. The elastic layer is formed with fluororubber or acrylonitrile-butadiene copolymer rubber, or the like. The surface of the elastic layer is coated with fluororesin, for example, as a coat layer with high smoothness.

As shown in FIG. 22, the intermediate transfer belt 521 is wound around among three support rollers 522, 523, and 524 to allow the intermediate transfer belt 521 to rotate in the clockwise. The support roller 523 is a drive roller, and the support roller 522 as a driven roller is attached with an encoder. The drive control system of these components is the same as that of FIG. 1 and FIG. 3, and hence overlapping explanation is omitted.

The encoder is fixed to the driven roller here, but it is not limited thereto. The encoder may be fixed to the drive roller or to the surface of the intermediate transfer belt 521 as a linear sensor. In the example of FIG. 22, an intermediate-transfer-belt cleaning device 525 is provided on the left side of the support roller 523 so that residual toner on the intermediate transfer belt 521 after an image is transferred is cleaned. Along the intermediate transfer belt 521 that is stretched between the support rollers 522 and 523, four image forming units 526 for yellow, cyan, magenta, and black are serially arranged along the direction of the movement of the intermediate transfer belt 521 to form a tandem image forming apparatus 527.

Provided above the tandem image forming apparatus 527 is an exposing device 528 as shown in FIG. 22. On the other hand, a secondary transfer device 529 is provided opposite to the tandem image forming apparatus 527 through the intermediate transfer belt 521. In the example of FIG. 22, the secondary transfer device 529 is configured by winding a secondary transfer belt 531 as an endless belt around between two rollers 530. The secondary transfer belt 531 is pressed against the support roller 524 through the intermediate transfer belt 521 to transfer the image on the intermediate transfer belt 521 to a sheet. A fixing device 532 that fixes the transferred image on the sheet is provided next to the secondary transfer device 529. The fixing device 532 is configured to press a press roller 534 against a fixing belt 533 as an endless belt.

The secondary transfer device 529 also includes a sheet conveying function that conveys the sheet with the transferred image thereon to the fixing device 532. The secondary transfer device 529 may include a transfer roller and a non-contact charger, but in this case, it becomes difficult for the device to have both the sheet conveying function and the components together.

In the example of FIG. 22, a sheet reversing device 535 is provided under the secondary transfer device 529 and the fixing device 532 in parallel with the tandem image forming apparatus 527. The sheet reversing device 535 reverses a sheet to record images on both surfaces of the sheet.

When copying is performed using the color copying machine, a document is placed on a document table 501 of the ADF 500 or a document is placed on a contact glass 502 for the scanner 510 by opening the ADF 500, and is pressed with the ADF 500 being closed.

A content of the document is to be read in the following manner. By pressing a start switch (not shown), the document placed on the ADF 500 is conveyed to the contact glass 502. On the other hand, when the document is placed on the contact glass 502, the scanner 510 is immediately driven to run a first movable element 512 and a second movable element 513. Light is radiated from a light source by the first movable element 512, the light reflected from the surface of the document is further reflected by the first movable element 512 to be directed toward the second movable element 513, the light is reflected by a mirror of the second movable element 513, and is pass ed through an imaging lens 514 to form an image on a reading sensor 515.

Further, by pressing the start switch (not shown), the drive motor and the drive roller 523 are rotated to allow the driven rollers 522 and 524 to rotate, and the intermediate transfer belt 521 is rotated. During the rotation, the photosensitive drums (Y, C, M, and K) of the respective image forming units 526 are rotated to form black, yellow, magenta, and cyan single-color images on the photosensitive drums, respectively. The intermediate transfer belt 521 is moved, and these single-color images are sequentially transferred to the intermediate transfer belt 521 to form a composite color image thereon.

On the other hand, by pressing the start switch (not shown), one of paper feed rollers 547 of the paper feed table 570 is selectively rotated, and a sheet is sent out from one of paper feed cassettes 549 provided in a multiple stage in a paper bank 548, is separated one by one in separation rollers 550 to be input to a paper conveying path 551. The sheet is then conveyed by conveying rollers 552 to be let into a paper conveying path 553 in the body 520, and abuts on a registration roller pair 554 to stop.

By rotating a paper feed roller 555, a sheet on a manual feed tray 556 is output and separated one by one in separation rollers 557 to be input into a manual feed path 558, and abuts on the registration roller pair 554 to stop.

The registration roller pair 554 is rotated at a timing adjusted to the composite color image on the intermediate transfer belt 521, and the sheet is put into a space between the intermediate transfer belt 521 and the secondary transfer device 529. The color image is transferred by the secondary transfer device 529 to be recorded on the sheet.

The sheet after the image is transferred thereto is conveyed by the secondary transfer device 529 to the fixing device 532. The image on the sheet is fixed in the fixing device 532 by heat and pressure, and the sheet is discharged by discharge rollers 560 by switching a switching claw 559, and the discharged sheet is stacked on a paper discharge tray 561. Alternatively, the sheet is input to the sheet reversing device 535 by switching the switching claw 559, and is reversed therein to be guided again to a transfer position. An image is recorded on the rear surface of the sheet and is discharged onto the paper discharge tray 561 using the discharge rollers 560.

On the other hand, the residual toner on the intermediate transfer belt 521 after the image is transferred is cleaned by the intermediate-transfer-belt cleaning device 525, and the intermediate transfer belt 521 is in standby state for the next image formation by the tandem image forming apparatus 527. The registration roller pair 554 is generally grounded, but it is also possible to apply a bias thereto in order to remove paper dust of the sheet.

In such a color copying machine, the rotational accuracy of the intermediate transfer belt 521 largely affects the quality of the final image. Therefore, it is desirable that the intermediate transfer belt is driven further highly accurately.

In the seventeenth embodiment, as the drive system of the intermediate transfer belt 521 of such a color copying machine, the drive control apparatus according to any one of the eleventh to thirteenth embodiments is used. Therefore, an inexpensive encoder with low resolution is used to construct the control system of the image carrier, which allows satisfactory drive control for the image carrier. Thus, it is possible to obtain a high-quality image at low cost with less color misalignment and banding.

An eighteenth embodiment of the present invention is explained below. The configuration of an image reading apparatus of this embodiment is the same as that of FIG. 14. Therefore, overlapping explanation is omitted.

In such an image reading apparatus, the drive accuracy of the photoelectric conversion unit 908 as a movable element largely affects the quality of a read-in image. Therefore, it is desirable that the photoelectric conversion unit 908 is driven further highly accurately.

In the image reading apparatus of the eighteenth embodiment, in order to drive the photoelectric conversion unit 908 highly accurately, the drive pulley, of the two pulleys 909 and 910 between which the wire 911 that drives the photoelectric conversion unit 908 is wound around, is driven by the rotor driver as shown in FIG. 2. The rotor driver is controlled by the drive control system (FIG. 1 and FIG. 3) in the same manner as the first embodiment. Therefore, according to this embodiment, the drive accuracy of the photoelectric conversion unit 908 at the constant velocity that moves along the surface of the document image is improved. Therefore, an inexpensive encoder with low resolution is allowed to construct the control system of the photoelectric conversion unit 908. Thus, it is possible to perform high-quality image reading at low cost.

As explained above, in the drive control method and apparatus, a belt device, an image forming apparatus, an image reading apparatus, and a computer program, an angular displacement of the rotor driven by the pulse motor or a displacement of the movable element is detected to obtain a detected value, and a difference between the detected value and a preset target value of the angular displacement or of the displacement is calculated. A driving frequency of a drive pulse signal used to drive the pulse motor is calculated according to the difference and a reference drive pulse frequency, and the drive of the pulse motor is controlled with the drive pulse signal having the drive frequency. Thereby, the pulse motor is controlled so that the angular displacement of the rotor or the displacement of the movable element approaches its target value. Further, the high accuracy drive control of the constant angular velocity and the constant velocity can be conducted. The invention is effective in the case where a target to be driven is always made to rotate at one direction and is driven so that an average rotational velocity becomes constant and the resolution of the encoder that measures a displacement is larger than the double amplitude of the main variation component of the target. Particularly, the present invention is suitable for the drive control of the target to be driven such as the image forming apparatus and the image reading apparatus, which requires a high positional accuracy of an image for forming a color image.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A driver for a motor to move an object, comprising:
   a difference calculator configured to calculate a difference between an amount of angular displacement of the object and a target value; and
   a motor controller configured to control the motor so that the object moves at a constant velocity, based on the difference.

2. The driver according to claim 1, further comprising a pulse frequency calculator configured to calculate a pulse frequency for driving the motor, based on the difference and a reference pulse frequency, wherein the motor is a pulse motor, and the motor controller controls the pulse motor so that the object moves at a constant velocity, based on the pulse frequency calculated.

3. The driver according to claim 1, wherein the object is a rotor, and the motor controller controls the motor so that the rotor rotates at a constant angular velocity, based on the difference.

4. The driver according to claim 1, wherein the object is a drive rotor configured to turn a driven rotor through a belt that is wound around the drive rotor and the driven rotor.

5. The driver according to claim 1, wherein the object is a driven rotor configured to be turned through a belt wound around the driven rotor and a drive rotor, and the drive rotor is turned by the motor.

6. The driver according to claim 1, wherein the object is a belt wound around a drive rotor and a driven rotor, and the drive rotor is turned by the motor.

7. The driver according to claim 1, further comprising:
   a pulse frequency calculator comprising a low-pass filter configured to shape a waveform of the difference.

8. The driver according to claim 1, further comprising:
   a pulse frequency calculator comprising a low-pass filter and a multiplier.

9. The driver according to claim 1, further comprising:
   a measuring unit configured to measure the amount of angular displacement.

10. The driver according to claim 9, wherein a resolution of the movement measuring unit is greater than double an amplitude of a main variation component of the object.

11. The driver according to claim 9, wherein the measuring unit is a rotary encoder.

12. The driver according to claim 9, wherein the measuring unit is a linear encoder.

13. The driver according to claim 11, wherein the object is a belt wound around a drive rotor turned by the motor and a driven rotor, and the rotary encoder is provided on a driven roller.

14. The driver according to claim 11, wherein the object is a belt wound around a drive rotor turned by the motor and a driven rotor, and the rotary encoder is provided on a drive roller.

15. The driver according to claim 12, wherein the object is a belt wound around a drive rotor turned by the motor and a driven rotor, and the linear encoder is provided on the belt.

16. An image forming apparatus comprising:
   an image carrier;
   a motor to move the image carrier;
   a measuring unit configured to measure an amount of angular displacement of the image carrier;
   a difference calculator configured to calculate a difference between the amount of angular displacement and a target value; and
   a motor controller configured to control the motor so that the image carrier moves at a constant velocity, based on the difference.

17. The image forming apparatus according to claim 16, wherein the image carrier is a photosensitive drum.

18. The image forming apparatus according to claim 16, wherein the image carrier is a photosensitive belt.

19. The image forming apparatus according to claim 16, wherein the image carrier is a transfer drum.

20. The image forming apparatus according to claim 16, wherein the image carrier is a transfer belt.

21. The image forming apparatus according to claim 16, wherein the image carrier comprises a plurality of image carriers configured to carry toner images of a plurality of colors, and the toner images are sequentially superposed on a belt to form a color image.

22. An image reading apparatus comprising:

an object including an optical system for image reading;

a motor configured to move the object along a plane of a target to be read;

a measuring unit configured to measure an amount of angular displacement of the object;

a difference calculator configured to calculate a difference between the amount of angular displacement and a target value; and a motor controller configured to control the motor so that the object moves at a constant velocity, based on the difference.

23. A method of driving a motor to move an object, comprising:

measuring an amount of angular displacement of the object;

calculating a difference between the amount of angular displacement and a target value; and controlling the motor so that the object moves at a constant velocity, based on the difference.

24. A computer program product for driving a motor to move an object, the computer program product including computer executable instructions stored on a computer readable medium, wherein the instructions, when executed by the computer, cause the computer to perform:

computer executable instructions in the computer program configured to measure an amount of angular displacement of the object;

computer executable instructions in the computer program configured to calculate a difference between the amount of angular displacement and a target value; and computer executable instructions in the computer program configured to control the motor so that the object moves at a constant velocity, based on the difference.

* * * * *